(12) United States Patent
    Ishikawa et al.

(10) Patent No.: US 12,578,091 B2
(45) Date of Patent: Mar. 17, 2026

(54) ELECTRONIC CONTROL DEVICE AND FLOW RATE MEASUREMENT SYSTEM

(71) Applicant: Hitachi Astemo, Ltd., Hitachinaka (JP)

(72) Inventors: Hiroto Ishikawa, Hitachinaka (JP); Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 306 days.

(21) Appl. No.: 18/038,257

(22) PCT Filed: Sep. 21, 2021

(86) PCT No.: PCT/JP2021/034485
    § 371 (c)(1),
    (2) Date: May 23, 2023

(87) PCT Pub. No.: WO2022/130719
    PCT Pub. Date: Jun. 23, 2022

(65) Prior Publication Data
    US 2023/0408087 A1        Dec. 21, 2023

(30) Foreign Application Priority Data

Dec. 16, 2020    (JP) ................................. 2020-208808

(51) Int. Cl.
    *F23N 5/18*        (2006.01)
    *F23L 13/02*        (2006.01)
    (Continued)

(52) U.S. Cl.
    CPC .............. *F23N 3/085* (2013.01); *F23L 13/02* (2013.01); *F23N 5/184* (2013.01); *F23N 5/245* (2013.01);
    (Continued)

(58) Field of Classification Search
    CPC .......... F23N 3/085; F23N 5/184; F23N 5/245; F23N 5/365; F23N 2223/52;
    (Continued)

(56) References Cited

U.S. PATENT DOCUMENTS 6,672,146 B1 *  1/2004  Kobayashi ............ F02D 41/187
                                                    73/114.34
8,694,226 B2 *  4/2014  Kurahashi ........... F02D 41/2474
                                                    701/103
                    (Continued)

FOREIGN PATENT DOCUMENTS

JP        2012-112716 A        6/2012
JP        2014-20212 A        2/2014
                    (Continued)

OTHER PUBLICATIONS

International Search Report (PCT/ISA/210) issued in PCT Application No. PCT/JP2021/034485 dated Dec. 14, 2021 with English translation (four (4) pages).
                    (Continued)

*Primary Examiner* — Avinash A Savani
(74) *Attorney, Agent, or Firm* — Crowell & Moring LLP

(57)        ABSTRACT

An electronic control device includes: a flow rate calculation unit that calculates a flow rate of intake air based on an output signal of a flow rate measurement device assembled to an intake pipe; a flow rate correction value calculation unit that calculates an average value, a maximum value, and a minimum value of the flow rate of the intake air, calculated by the flow rate calculation unit, during a predetermined period, and an amplitude of a signal with one or more frequencies equal to or higher than a fundamental frequency of the output signal of the flow rate measurement device and included in the output signal of the flow rate measurement device, and calculates a correction value for the flow rate of the intake air based on calculation results; and a flow rate (Continued)

correction unit that corrects the flow rate of the intake air based on the correction value.

13 Claims, 20 Drawing Sheets

(51) Int. Cl.

| | |
|---|---|
| *F23N 3/08* | (2006.01) |
| *F23N 5/24* | (2006.01) |
| *F23N 5/26* | (2006.01) |
| *G01F 1/696* | (2006.01) |
| *G01F 1/72* | (2006.01) |

(52) U.S. Cl.

CPC ........ *F23N 2005/181* (2013.01); *F23N 5/265* (2013.01); *F23N 2221/12* (2020.01); *F23N 2223/48* (2020.01); *F23N 2223/52* (2020.01); *F23N 2223/54* (2020.01); *F23N 2235/06* (2020.01); *F23N 2900/05181* (2013.01); *G01F 1/6965* (2013.01); *G01F 1/72* (2013.01)

(58) Field of Classification Search

CPC ............. F23N 2223/48; F23N 2223/54; F23N 2221/12; F23N 2005/181; F23N 2900/05181; F23L 13/02; G01F 1/6965; G01F 1/72

USPC .......................................................... 431/18

See application file for complete search history.

(56) References Cited

U.S. PATENT DOCUMENTS

| | | | |
|---|---|---|---|
| 11,365,699 B2 | 6/2022 | Suzuki et al. | |
| 2011/0168278 A1* | 7/2011 | Ootani | F23N 1/002 |
| | | | 137/486 |
| 2017/0115150 A1* | 4/2017 | Ikeuchi | G01F 1/6842 |
| 2018/0299309 A1 | 10/2018 | Matsumoto et al. | |
| 2020/0040834 A1* | 2/2020 | Ito | F02D 41/18 |
| 2020/0200583 A1* | 6/2020 | Matsumoto | G01F 5/00 |
| 2021/0270202 A1 | 9/2021 | Suzuki et al. | |
| 2022/0214196 A1 | 7/2022 | Matsumoto et al. | |

FOREIGN PATENT DOCUMENTS

| | | |
|---|---|---|
| JP | 2017-90322 A | 5/2017 |
| JP | 2019-132866 A | 8/2019 |
| JP | 2020-186988 A | 11/2020 |
| WO | WO 2020/066548 A1 | 4/2020 |

OTHER PUBLICATIONS

Japanese-language Written Opinion (PCT/ISA/237) issued in PCT Application No. PCT/JP2021/034485 dated Dec. 14, 2021 (three (3) pages).
Chinese-language Office Action issued in Chinese Application No. 202180075616.3 dated Dec. 18, 2025 with partial English translation (23 pages).

* cited by examiner

ECU

31

CONTROL UNIT

31a

| CPU |

36

33

| INPUT-OUTPUT INTERFACE |

31b

| ROM |

32

| STORAGE UNIT |

31c

| RAM |

⬚ : Cooled-EGR INTRODUCTION AREA

FRESH AIR EQUAL-FLOW LINE

⬚ : MILLER CYCLE AREA

LATE CLOSING MILLER CYCLE

EARLY CLOSING MILLER CYCLE

REFERENCE CONDITION

PULSATION A (MILLER CYCLE)

PULSATION B (EGR)

PULSATION CORRECTION MAP

MULTIDIMENSIONAL PULSATION CORRECTION MAP

MULTIDIMENSIONAL PULSATION CORRECTION MAP

FIG. 13A

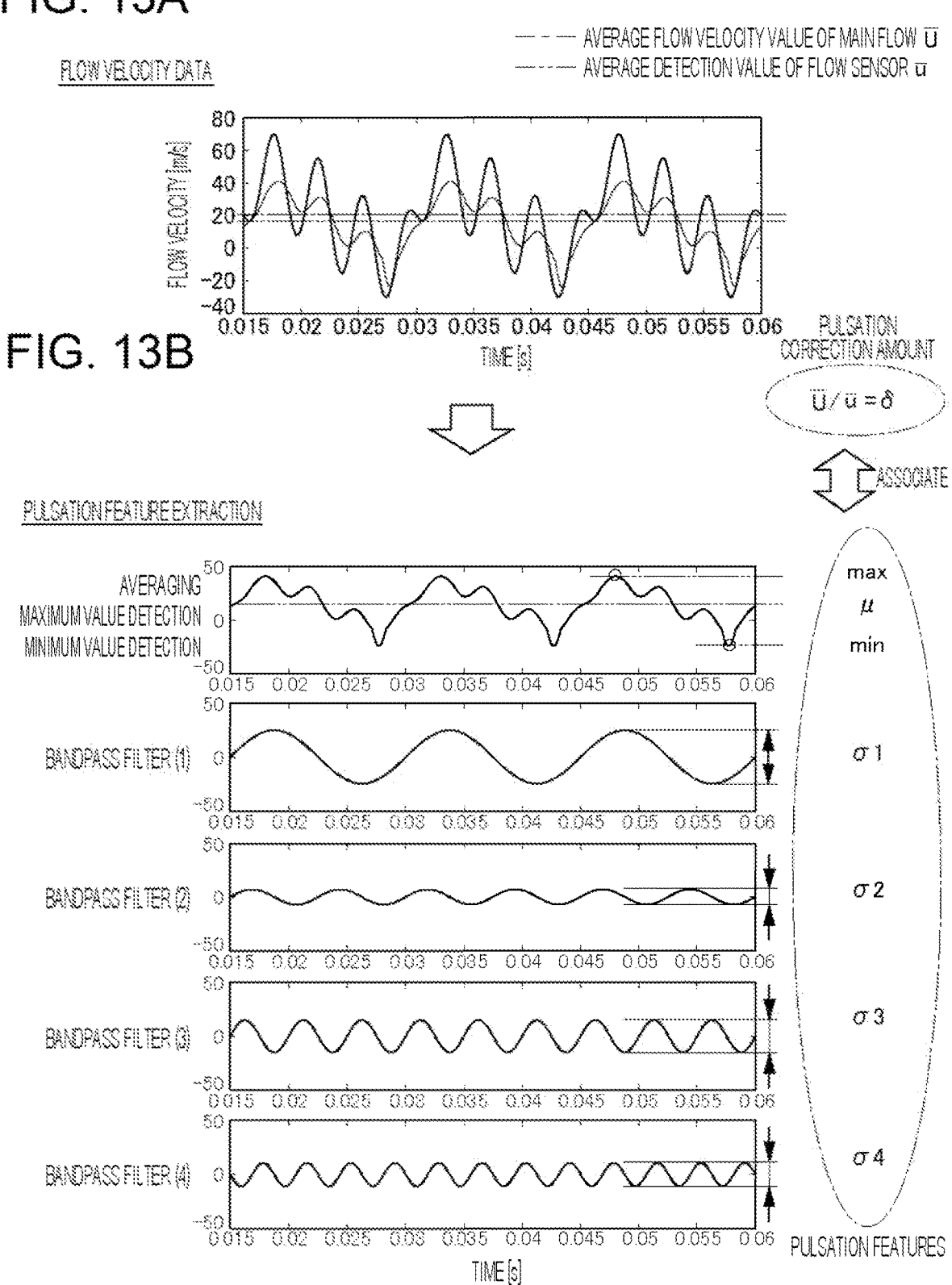

FLOW VELOCITY DATA

- - - - AVERAGE FLOW VELOCITY VALUE OF MAIN FLOW $\bar{u}$
- - - - AVERAGE DETECTION VALUE OF FLOW SENSOR $\bar{u}$

FIG. 13B

PULSATION
CORRECTION AMOUNT $$\bar{U}/\bar{u} = \delta$$

ASSOCIATE

PULSATION FEATURE EXTRACTION

AVERAGING
MAXIMUM VALUE DETECTION
MINIMUM VALUE DETECTION max
$\mu$
min

BANDPASS FILTER (1)          $\sigma 1$

BANDPASS FILTER (2)          $\sigma 2$

BANDPASS FILTER (3)          $\sigma 3$

BANDPASS FILTER (4)          $\sigma 4$

TIME [s]                     PULSATION FEATURES $$z = w_1 a_1 + w_2 a_2 + \cdots + w_n a_n + b$$

$$a = f(z)$$

w: WEIGHT b: BIAS

ACTIVATION FUNCTION

SUPERVISED LEARNING (BACKPROPAGATION)

PULSATION FEATURES

INPUT LAYER

INTERMEDIATE LAYER

OUTPUT LAYER

PULSATION CORRECTION AMOUNT

PULSATION CORRECTION AMOUNT CALCULATION

PULSATION FEATURES

INPUT LAYER

INTERMEDIATE LAYER

OUTPUT LAYER

PULSATION CORRECTION AMOUNT

MEASURED VALUE

CORRECTION VALUE IN PRIOR ART

CORRECTION VALUE IN PRESENT INVENTION

ELECTRONIC CONTROL DEVICE AND FLOW RATE MEASUREMENT SYSTEM

TECHNICAL FIELD

The present invention relates to an electronic control device and a flow rate measurement system.

BACKGROUND ART

Conventionally, a control technique for an internal combustion engine is known in which a flow rate of air sucked into the internal combustion engine is measured by a flow sensor assembled in the intake pipe of the internal combustion engine, the amount of air filled into a cylinder is calculated based on the measured amount of intake air, and the fuel injection amount and ignition timing are controlled in accordance with the calculated amount of air. For example, there is disclosed a technique for correcting a detection error of a flow sensor based on a pulsation amplitude because the detection error of the flow sensor increases as the pulsation of the air sucked into the internal combustion engine increases (e.g., see PTL 1).

CITATION LIST

Patent Literature

PTL 1: JP 2014-020212 A

SUMMARY OF INVENTION

Technical Problem

However, depending on the operation condition of the internal combustion engine, the correction based on the pulsation amplitude alone may not be sufficient to correct the detection error of the flow sensor. There is a problem in that due to the detection error of the flow sensor, the control accuracy of the fuel injection amount and ignition timing deteriorate, and the exhaust gas properties and fuel consumption of the internal combustion engine deteriorate.

The present invention has been made in view of the above circumstances, and an object of the present invention is to accurately obtain the flow rate of intake air even under an operation condition of an internal combustion engine in which various pulsations occur in the flow of the intake air at the position of the flow sensor.

Solution to Problem

In order to solve the above problem, an electronic control device according to one aspect of the present invention includes: a flow rate calculation unit that calculates a flow rate of intake air based on an output signal of a flow rate measurement device assembled to an intake pipe; a flow rate correction value calculation unit that calculates an average value, a maximum value, and a minimum value of the flow rate of the intake air, calculated by the flow rate calculation unit, during a predetermined period, and an amplitude of a signal with one or more frequencies equal to or higher than a fundamental frequency of the output signal of the flow rate measurement device and included in the output signal of the flow rate measurement device, and calculates a correction value for the flow rate of the intake air based on calculation results; and a flow rate correction unit that corrects the flow rate of the intake air based on the correction value.

Advantageous Effects of Invention

According to at least one aspect of the present invention, the detection error of the flow rate measurement device is appropriately corrected based on the average value, the maximum value, and the minimum value of the output signal of the flow rate measurement device and the amplitude information of one or more frequency components included in the output signal of the flow rate measurement device. As a result, the flow rate of the intake air can be accurately obtained even in an operation condition of the internal combustion engine in which various pulsations occur in the flow of the intake air at the position of the flow rate measurement device. Therefore, it is possible to prevent deterioration in the exhaust gas property and deterioration in the fuel consumption of the internal combustion engine, which are concerned at the time of large pulsation.

Problems, structures, and effects other than those described above will be described in the following examples.

BRIEF DESCRIPTION OF DRAWINGS

FIG. 2 is a block diagram illustrating a hardware configuration example of an electronic control unit (ECU).

FIGS. 13A and 13B are explanatory diagrams illustrating a method for extracting features of pulsation waveforms according to a second embodiment of the present invention.

DESCRIPTION OF EMBODIMENTS

Figure 1:
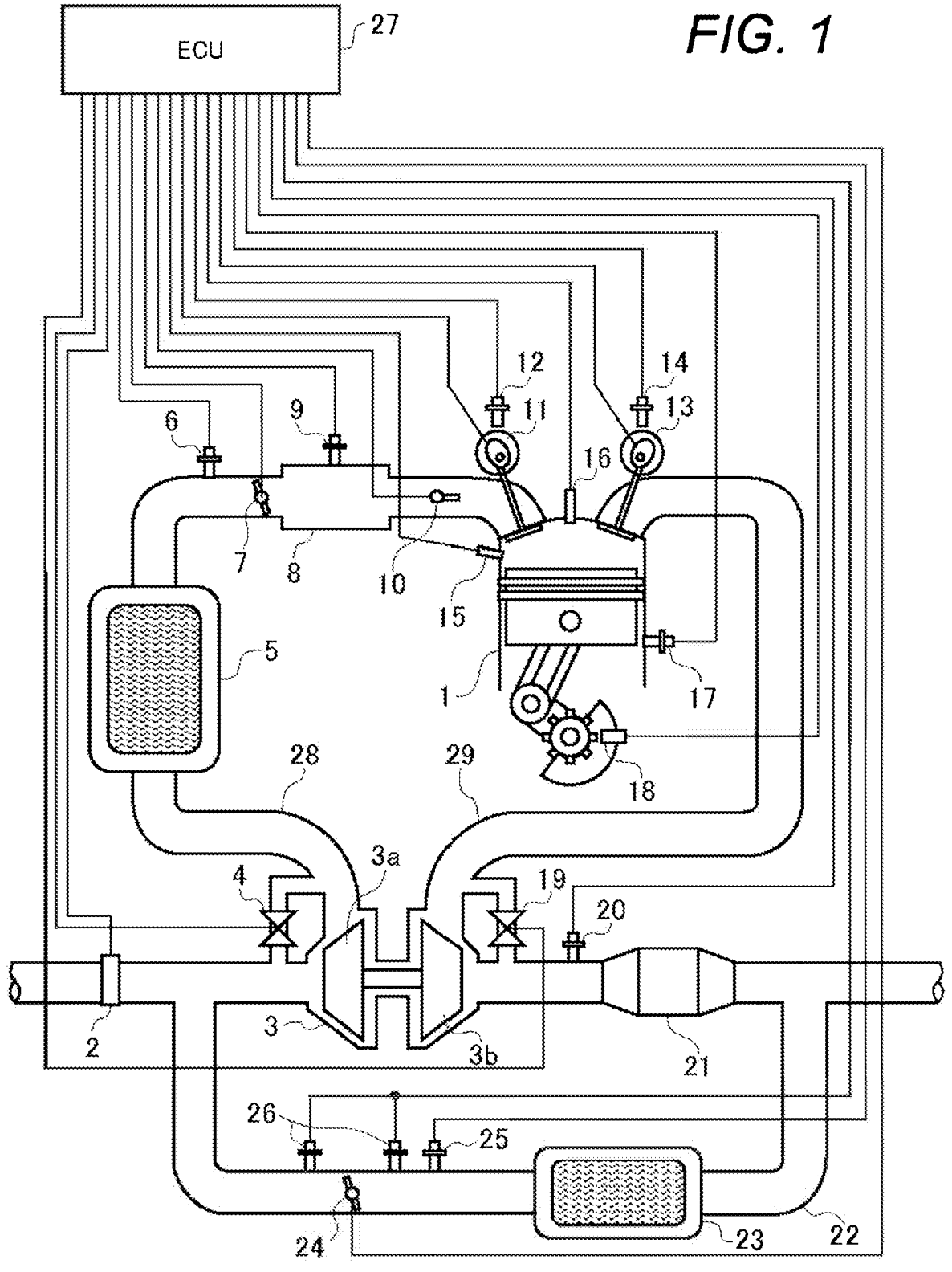
FIG. 1 is a schematic diagram illustrating an overall configuration example of an internal combustion engine system to be controlled by an electronic control device according to a first embodiment of the present invention.

Hereinafter, examples of embodiments for carrying out the present invention will be described with reference to the accompanying drawings. In the present specification and the accompanying drawings, constituent elements having substantially the same function or configuration are denoted by the same reference numeral, and redundant description is omitted.

First Embodiment

First, an overall configuration of an internal combustion engine system to be controlled by an electronic control device according to a first embodiment of the present invention will be described.
[Overall Configuration of Internal Combustion Engine System]
FIG. 1 is a schematic diagram illustrating an overall configuration example of an internal combustion engine system.

The internal combustion engine system includes an internal combustion engine 1, a flow sensor 2, a turbocharger 3, an air bypass valve 4, an intercooler 5, a supercharging temperature sensor 6, a throttle valve 7, an intake manifold 8, a boost pressure sensor 9, a flow enhancement valve 10, an intake valve 11, an exhaust valve 13, a fuel injection valve 15, an ignition plug 16, a knocking sensor 17, and a crank angle sensor 18. The internal combustion engine system further includes a wastegate valve 19, an air-fuel ratio sensor 20, an exhaust purification catalyst 21, an exhaust gas recirculation (EGR) pipe 22, an EGR cooler 23, an EGR valve 24, a temperature sensor 25, a differential pressure sensor 26, and an ECU (Electronic Control Unit) 27.

An intake flow path (intake pipe 28) and an exhaust flow path (exhaust pipe 29) communicate with each other via the internal combustion engine 1. The flow sensor 2 and an intake air temperature sensor (not illustrated) built in the flow sensor 2 have been assembled to the intake flow path. The turbocharger 3 includes a compressor 3a and a turbine 3b. The compressor 3a is connected to the intake flow path, and the turbine 3b is connected to the exhaust flow path. The turbine 3b of the turbocharger 3 converts the energy of exhaust gas from the internal combustion engine 1 into the rotational energy of a turbine blade. The compressor 3a of the turbocharger 3 compresses intake air flowing in from the intake flow path by rotation of a compressor blade connected to the turbine blade.

The intercooler 5 is provided downstream of the compressor 3a of the turbocharger 3 and cools the intake air temperature of the intake air that has been adiabatically compressed and increased by the compressor 3a. The supercharging temperature sensor 6 is assembled downstream of the intercooler 5 and measures the temperature (supercharging temperature) of the intake air cooled by the intercooler 5.

The throttle valve 7 is provided downstream of the supercharging temperature sensor 6 and narrows the intake flow path to control the amount of intake air flowing into the cylinder of the internal combustion engine 1. The throttle valve 7 is formed of an electronically controlled butterfly valve capable of controlling a valve opening independently of an accelerator pedal depression amount by an operator. The intake manifold 8 with the boost pressure sensor 9 assembled thereto communicates downstream of the throttle valve 7.

Note that the intake manifold 8 provided downstream of the throttle valve 7 and the intercooler 5 may be integrated. In this case, the volume from the downstream of the compressor 3a to the cylinder can be reduced, thus improving the responsiveness and controllability of acceleration and deceleration.

The flow enhancement valve 10 is disposed downstream of the intake manifold 8 and generates a drift in the air sucked into the cylinder to enhance the turbulence of the flow inside the cylinder. At the time of performing the exhaust gas recirculation combustion to be described later, the flow enhancement valve 10 is closed to promote and stabilize the turbulent flow combustion.

The internal combustion engine 1 is provided with the intake valve 11 and the exhaust valve 13. Each of the intake valve 11 and the exhaust valve 13 has a variable valve mechanism for continuously varying the opening and closing phases of the valve. An intake valve position sensor 12 and an exhaust valve position sensor 14 for detecting the opening and closing phases of the valves have been assembled to the variable valve mechanisms of the intake valve 11 and the exhaust valve 13, respectively. The cylinder of the internal combustion engine 1 is provided with the direct fuel injection valve 15 that directly injects fuel into the cylinder. Note that the fuel injection valve 15 may be of a port injection type that injects fuel into an intake port.

To the cylinder of the internal combustion engine 1, the ignition plug 16 that exposes an electrode portion in the cylinder and ignites a combustible air-fuel mixture by a spark has been assembled. The knocking sensor 17 is provided in a cylinder block and detects the vibration of the cylinder block caused by combustion pressure vibration generated in a combustion chamber to detect knocking. The crank angle sensor 18 is assembled to a crankshaft and outputs a signal corresponding to the rotation angle of the crankshaft to the ECU 27 as a signal indicating the rotational speed of the crankshaft.

The air-fuel ratio sensor 20 is provided downstream of the turbine 3b of the turbocharger 3 and outputs a signal indicating an exhaust gas composition detected, that is, an air-fuel ratio to the ECU 27. The exhaust purification catalyst 21 is, for example, a three-way catalyst, is provided downstream of the air-fuel ratio sensor 20, and purifies harmful exhaust gas components such as carbon monoxide, nitrogen compounds, and unburned hydrocarbon in the exhaust gas through catalytic reaction. In general, platinum and rhodium, or platinum and rhodium mixed with palladium, are used as the catalyst substance.

The turbocharger 3 includes an air bypass valve 4 and a wastegate valve 19. The air bypass valve 4 is disposed on a bypass flow path connecting the upstream and the downstream of the compressor 3a in order to prevent the pressure from excessively increasing from the downstream of the compressor 3a to the upstream of the throttle valve 7. When the throttle valve 7 is suddenly closed in the supercharging state, the air bypass valve 4 is opened according to the control of the ECU 27, whereby the compressed intake air downstream of the compressor 3a flows back to the upstream portion of the compressor 3a through the bypass flow path. As a result, the boost pressure is immediately reduced to enable the prevention of a phenomenon called surging and appropriately prevent damage to the compressor 3a.

The wastegate valve 19 is disposed on a bypass flow path connecting the upstream and downstream of the turbine 3b. The wastegate valve 19 is an electric valve with a valve opening freely controllable relative to boost pressure by control of the ECU 27. When the opening of the wastegate valve 19 is adjusted by the ECU 27 based on the boost pressure detected by the boost pressure sensor 9, a part of the exhaust gas passes through the bypass flow path, so that the work given to the turbine 3b by the exhaust gas can be reduced. As a result, the boost pressure can be held at the target pressure.

The EGR pipe 22 communicates an exhaust flow path downstream of the exhaust purification catalyst 21 and an intake flow path upstream of the compressor 3a, splits the exhaust gas from the downstream of the exhaust purification catalyst 21, and returns the exhaust gas to the upstream of the compressor 3a. The EGR cooler 23 provided in the EGR pipe 22 cools the exhaust gas. The EGR valve 24 is provided downstream of the EGR cooler 23 and controls the flow rate of the exhaust gas. The EGR pipe 22 is provided with a temperature sensor 25 for detecting the temperature of the exhaust gas flowing upstream of the EGR valve 24 and a differential pressure sensor 26 for detecting the differential pressure between the upstream and downstream of the EGR valve 24.

The ECU 27 is an example of an electronic control device and is an arithmetic circuit that controls each constituent element of the internal combustion engine system and performs various data processing. The various sensors and various actuators described above are communicatively connected to the ECU 27. The ECU 27 controls the operations of the actuators such as the throttle valve 7, the fuel injection valve 15, the intake valve 11, the exhaust valve 13, and the EGR valve 24. Further, the ECU 27 detects the operation state of the internal combustion engine 1 based on signals input from the various sensors and causes the ignition plug 16 to ignite at a timing determined in accordance with the operation state. In the present embodiment, the flow sensor 2 and the ECU 27 constitute a flow rate measurement system.

[Hardware Configuration of ECU]

Next, the hardware configuration of the ECU 27 will be described. Here, an example of a hardware configuration of a computer included in the ECU 27 will be described.

Figure 2:
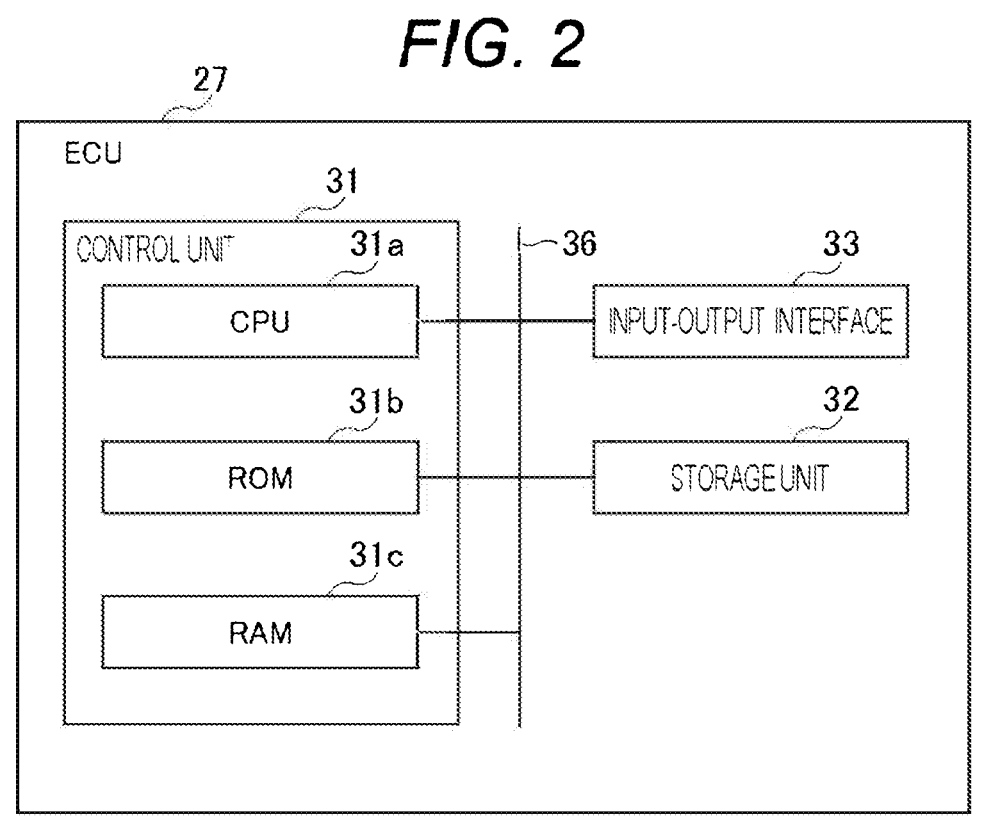

FIG. 2 is a block diagram illustrating an example of the hardware configuration the ECU 27.

The ECU 27 includes a control unit 31, a storage unit 32, and an input-output interface 33 that are interconnected via a system bus 36. The control unit 31 includes a central processing unit (CPU) 31a, a read-only memory (ROM) 31b, and a random-access memory (RAM) 31c. The CPU 31a loads a control program stored in the ROM 31b into the RAM 31c and executes the program, thereby implementing each function of the ECU 27. That is, the control unit 31 is used as an example of a computer that controls the operation of the internal combustion engine system.

The storage unit 32 is an auxiliary storage device including a semiconductor memory or the like. For example, parameters used in the control program, a conversion table, a pulsation correction map (cf. FIGS. 10 and 12), a neural network model (cf. FIGS. 15A and 15B), data obtained by executing the control program, and the like are recorded in the storage unit 32. A control program may be stored in the storage unit 32.

The input-output interface 33 is an interface that communicates signals and data with each sensor and each actuator. The ECU 27 includes an analog-to-digital (A/D) converter (not illustrated) that processes input-output signals of each sensor, a driver circuit, and the like. The input-output interface 33 may also serve as an A/D converter. Although the CPU is used as the processor, another processor such as a micro-processing unit (MPU) may be used.

Hereinafter, a description will be given of a method for controlling the internal combustion engine 1 to realize fuel-efficient operation by an EGR system, a Miller cycle system, and the wastegate system provided in the internal combustion engine 1.

[Operation Area for Performing EGR]

Figure 3:
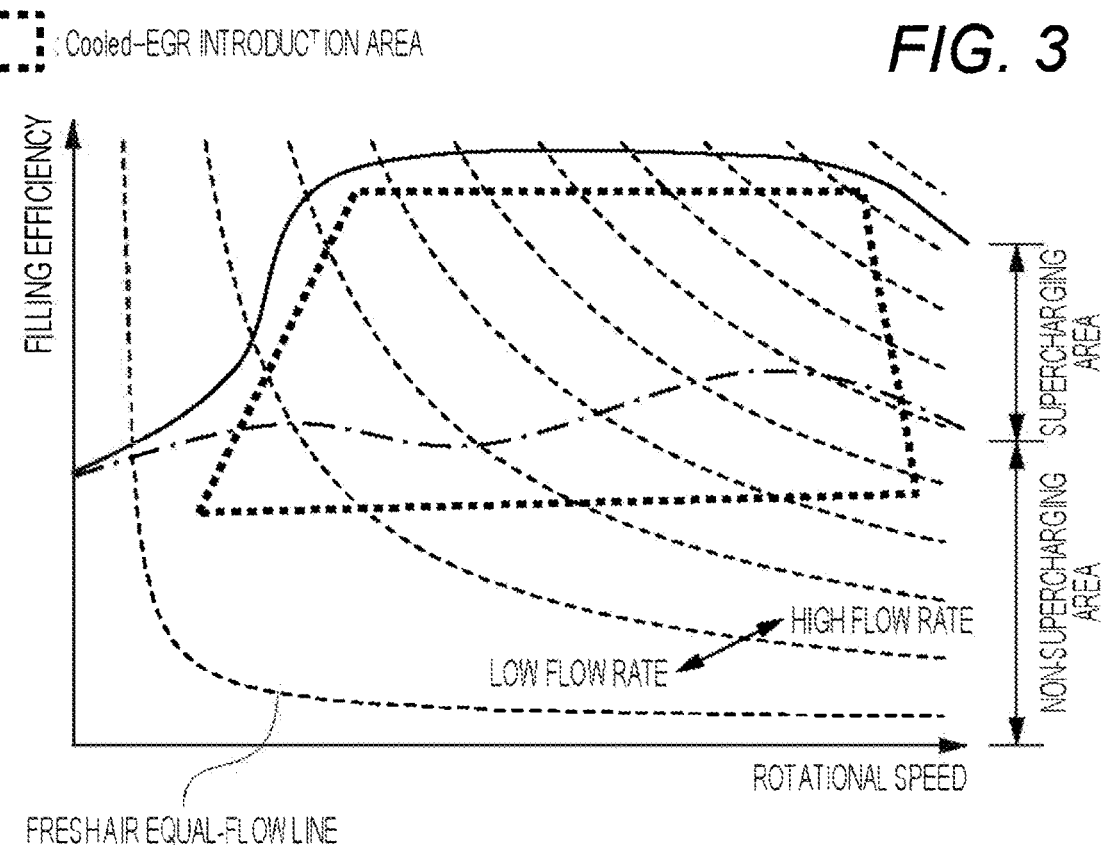
FIG. 3 is a graph representing an operation area where exhaust gas recirculation (EGR) is introduced in an operation area defined by a rotational speed and a filling efficiency of an internal combustion engine.

FIG. 3 is a graph representing an operation area where EGR (recirculated exhaust gas) is introduced in an operation area defined by the rotational speed and the filling efficiency of the internal combustion engine 1. The filling efficiency is the ratio of the mass of air sucked into the cylinder in one cycle to the mass of air in the standard state equivalent to the cylinder volume. The graph of FIG. 3 is an example of a case where cooled EGR is introduced, with the horizontal axis representing the rotational speed and the vertical axis representing the filling efficiency. A portion surrounded by the thick dashed line is a cooled EGR introduction area.

The operation area of the internal combustion engine 1 is roughly divided into a non-supercharging area and a supercharging area. In the non-supercharging area, the filling efficiency is controlled by the throttle valve, and in the supercharging area, the filling efficiency is controlled by opening the throttle valve and controlling the boost pressure with the wastegate valve. As described above, the means for adjusting the engine torque can be switched between the non-supercharging area and the supercharging area to reduce pumping loss generated in the internal combustion engine 1 and realize fuel-efficient operation. The thin dashed line indicates a fresh air equal-flow line.

Furthermore, the internal combustion engine 1 described in the present embodiment is mounted with the EGR system. The EGR gas cooled by the EGR cooler is returned to the cylinder from a relatively high load condition (high filling efficiency) in the non-supercharging area of the internal combustion engine 1 to the supercharging area, whereby the air sucked into the cylinder is diluted with the EGR gas that is an inert gas. Hence it is possible to prevent incorrect combustion called knocking that is likely to occur in a high load condition. Because the knocking can be prevented, it is possible to appropriately control the ignition timing (advancing, retarding) and realize fuel-efficient operation.

[Operation Area for Performing Miller Cycle]

Figure 4:
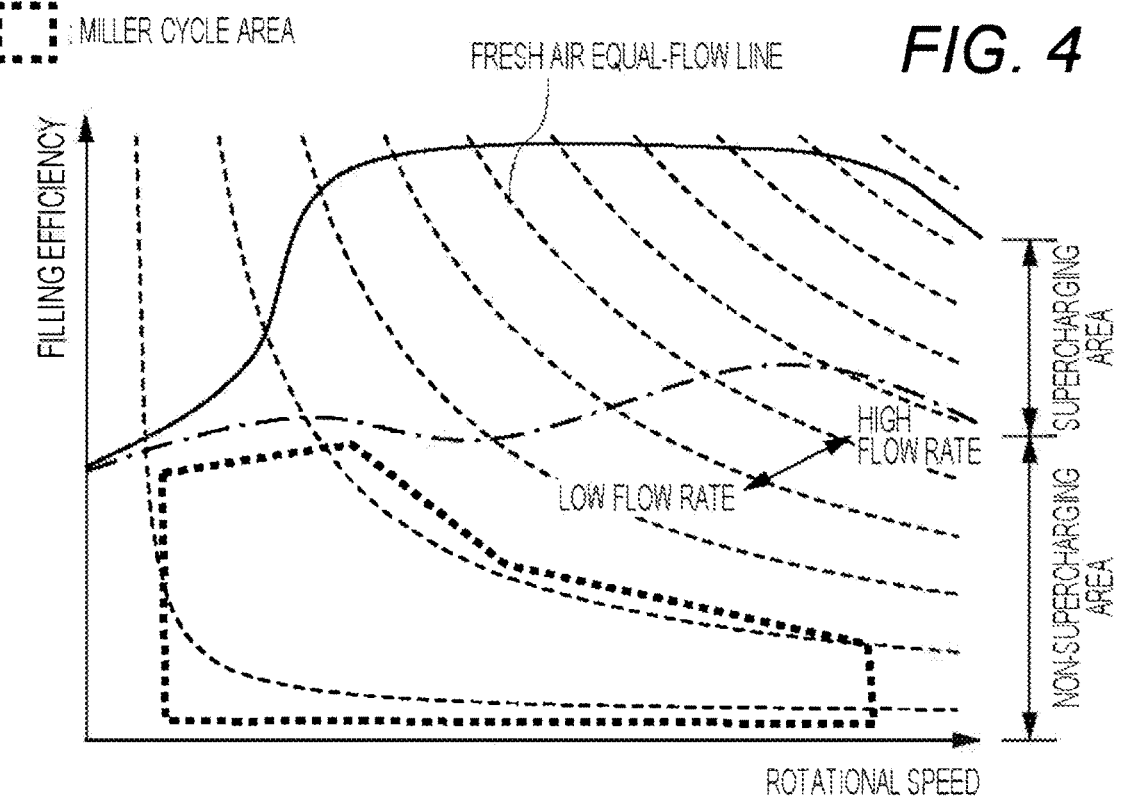
FIG. 4 is a graph representing an operation area for performing a Miller cycle in an operation area defined by a rotational speed and a filling efficiency of an internal combustion engine.

FIG. 4 is a graph representing an operation area for performing the Miller cycle in an operation area defined by the rotational speed and the filling efficiency of the internal combustion engine 1. A portion surrounded by the thick dashed line is a Miller cycle introduction area.

In an operation area of the internal combustion engine 1 at a relatively low flow rate, the throttle valve 7 is controlled to be closed more in order to reduce the amount of air sucked into the cylinder. This tends to increase pumping loss. By shifting the intake valve closing timing to the earlier side or the later side from the bottom dead center, the compression work of the piston can be reduced, and the Miller cycle can be realized. In addition, when the amount of intake air is controlled by controlling the phase of the intake valve instead of the throttle valve 7, the throttle valve 7 can be set to be opened more, and pumping loss can be reduced. By the effect of the Miller cycle and the pumping loss reduction effect, fuel-efficient operation can be realized.

[Lift Patterns of Intake Valve and Exhaust Valve]

Figure 5A:
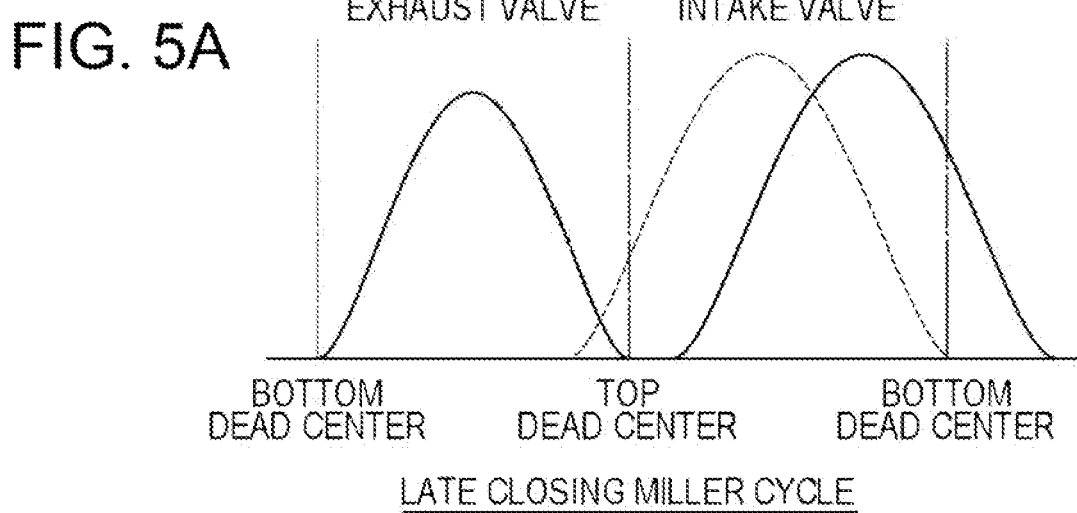
FIGS. 5A and 5B are graphs representing lift patterns of an intake valve and an exhaust valve that realize a late closing Miller cycle and an early closing Miller cycle.
Figure 5B:
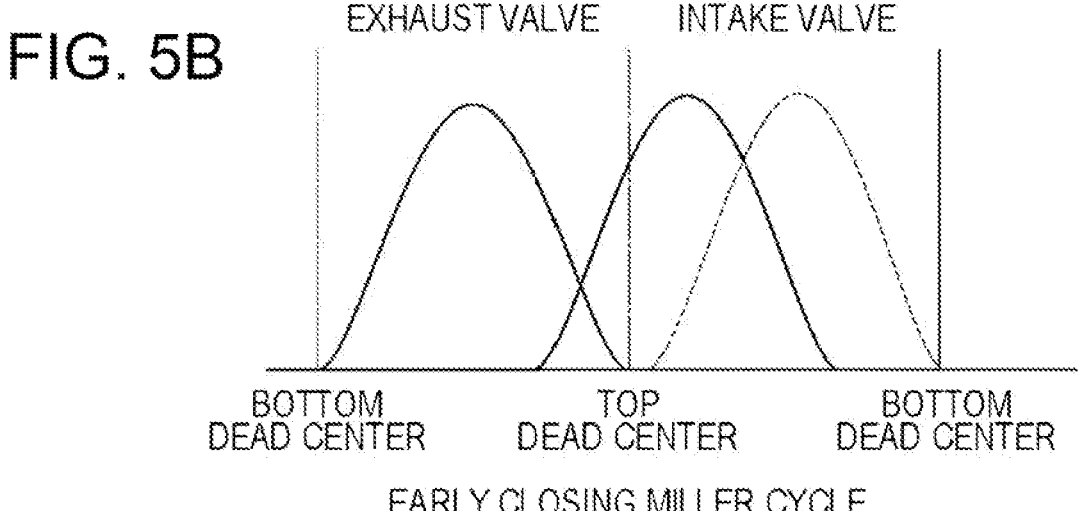

FIGS. 5A and 5B are graphs representing the lift patterns of the intake valve 11 and the exhaust valve 13 that realize a late closing Miller cycle and an early closing Miller cycle.

When the configuration capable of varying the phase of the intake valve 11 is employed, and the intake valve closing timing is set to the earlier side or the later side with the bottom dead center as the base point, the amount of air sucked into the cylinder increases or decreases. In the late closing Miller cycle illustrated in the upper part of the drawing, the gas once sucked into the cylinder is blown back to the intake pipe 28 after the bottom dead center, thereby reducing the amount of intake air into the cylinder. On the other hand, in the early closing Miller cycle illustrated in the lower part of the drawing, the intake valve is closed while gas is being sucked into the cylinder, thereby reducing the amount of intake air into the cylinder.

In the internal combustion engine system according to the present embodiment, the variable intake valve phase mechanism is employed to realize the Miller cycle, but it is also possible to realize the Miller cycle by employing a variable valve timing/lift mechanism capable of switching the opening and closing timings and the amount of lift of the intake valve or a continuously variable phase/lift mechanism.

[Intake Air Pulsation Behavior when Miller Cycle and EGR are Performed]

Figure 6A:
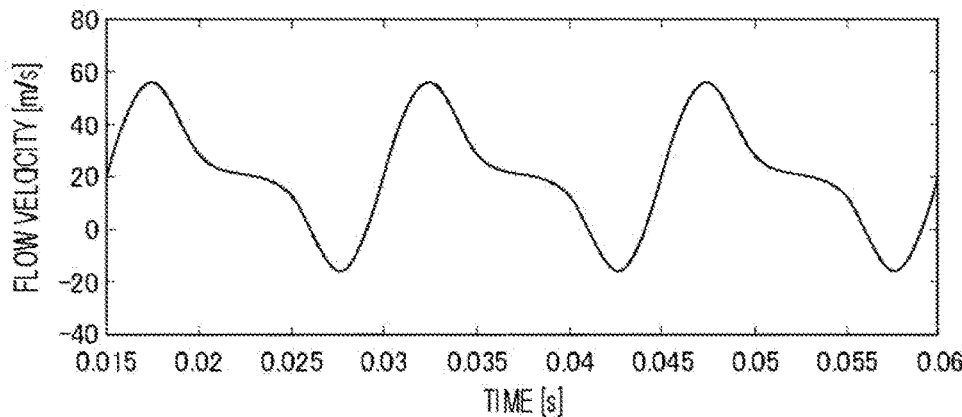
FIGS. 6A to 6C are graphs representing an example of pulsations (intake air pulsation behavior) of output signals of a flow sensor when a Miller cycle and EGR are performed.
Figure 6B:
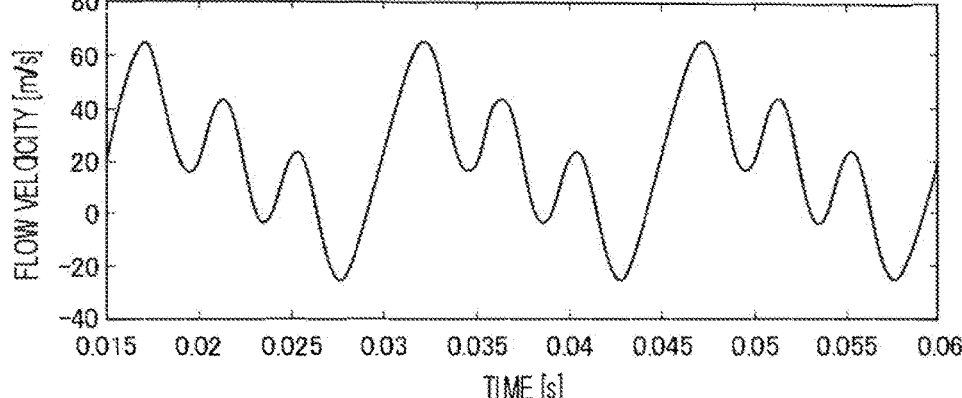
Figure 6C:
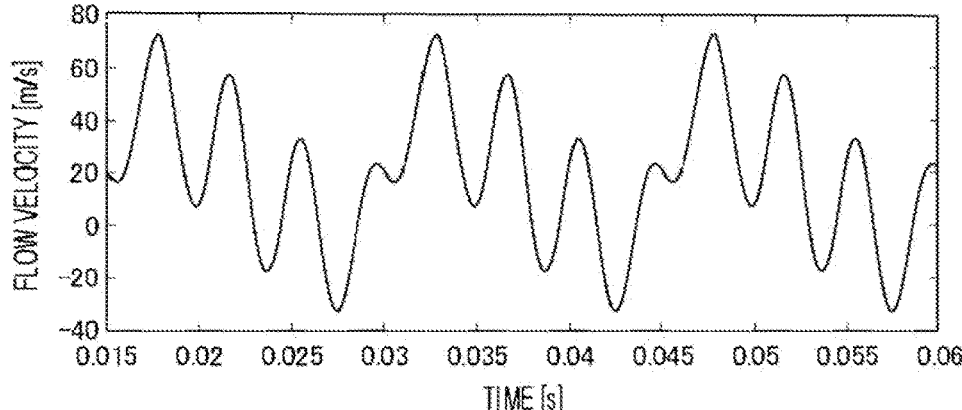

FIGS. 6A to 6C are graphs representing an example of pulsations (intake air pulsation behavior) of the output signals of the flow sensor 2 when the Miller cycle and the EGR are performed. In FIGS. 6A to 6C, the horizontal axis represents time [s], and the vertical axis represents flow velocity [m/s]. In the present specification, the output signal of the flow sensor 2 is also referred to as a "flow rate signal".

The shape of the output signal of the flow sensor 2 may be referred to as a "pulsation waveform".

As illustrated in the upper part of the drawing, in the internal combustion engine 1, a pulsation occurs in the intake pipe 28 because the air intake is intermittently performed only in the intake stroke of each cylinder. In particular, in a low-rotation and high-load area, a pulsation with a large pulsation amplitude ratio tends to occur at a low frequency, which causes deterioration in the detection accuracy of the flow sensor 2. The pulsation amplitude ratio is a ratio between the amplitude (between the maximum value and the minimum value) of the signal with the fundamental frequency component included in the flow rate signal and the average value of the signal. in a low-rotation and high-load condition in which the pulsation amplitude increases relative to the average flow velocity, there is a timing at which the flow velocity direction indicates reverse flow.

The middle part of the drawing illustrates the intake air pulsation behavior (pulsation A) of the flow sensor 2 when the Miller cycle (late closing) is performed. As described in FIGS. 5A and 5B, in the late closing Miller cycle, the gas once sucked into the cylinder is blown back to the intake pipe 28. In the late closing Miller cycle, the throttle valve 7 is set be opened more than in the normal cycle. Due to the influences of these, the pulsation generated in the cylinder easily reaches the flow sensor 2 during the late closing Miller cycle.

The lower part of the drawing illustrates the intake air pulsation behavior (pulsation B) of the flow sensor 2 at the time of introduction of EGR. The exhaust pulsation is larger than that on the intake side (the flow velocity and amplitude are larger), and the pulsation propagates to the intake side through the EGR pipe 22. When the EGR valve is set to the opening side in order to return more EGR gas, the pulsation of the flow sensor 2 tends to increase.

As described above, performing the Miller cycle or the EGR causes turbulence in the flow in the intake pipe 28. Therefore, the pulsation when the Miller cycle or the EGR is performed becomes a pulsation having a frequency component with a higher frequency than the pulsation caused by the intake stroke of the normal cycle. In such a pulsation phenomenon, not only a pulsation amplitude rate but also a pulsation frequency and a pulsation waveform, which is determined by a combination of these factors, are important.

[Airflow Inside Flow Sensor]

Figures 7A, 7B:
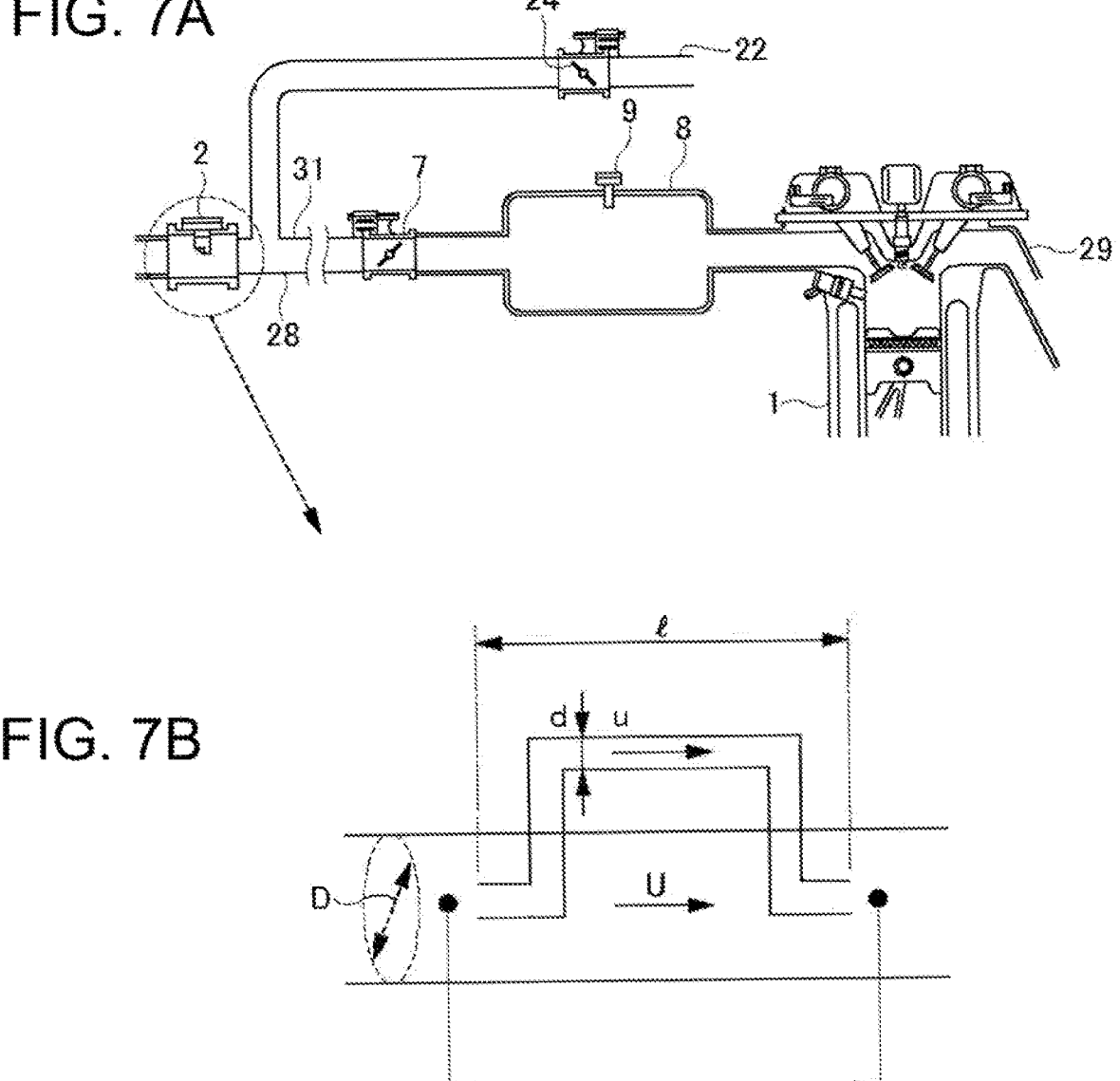
FIGS. 7A and 7B are conceptual diagrams illustrating an airflow inside the flow sensor.

FIGS. 7A and 7B are conceptual diagrams illustrating an airflow inside the flow sensor 2.

The flow sensor 2 is provided with a bypass flow path, and a sensor element for detecting a flow velocity is installed in the bypass flow path. By devising the shape of the bypass flow path, dust and water can be prevented from adhering to the sensor element. The flow sensor 2 detects the amount of heat radiation caused by the local flow of the sensor element having a heating resistive element as a main constituent element to output a voltage signal corresponding to the flow rate of the main flow in the portion of the intake pipe 28 in which the flow sensor 2 is mounted. As illustrated in the drawing, the main flow and the bypass flow are different from each other in the shape of the flow field (length L, l, inner diameter D, d), shape loss coefficient (Cp, cp), and friction loss coefficient (Cf, cf), so that the main flow and the bypass flow are flow fields based on different momentum equations. When the flow rate of the main flow path is U, and the flow rate of the bypass flow path is u, the flow velocity dU/dt of the main flow and the flow velocity du/dt of the bypass flow can be expressed by the following equations (1) and (2), respectively.

$$\frac{dU}{dt} = -\frac{1}{2}U|U|\frac{C_p}{L} - \frac{1}{2}U|U|\frac{C_f}{D} \tag{1}$$

$$\frac{du}{dt} = -\frac{1}{2}u|u|\frac{c_p}{l} - \frac{1}{2}u|u|\frac{c_f}{d} \tag{2}$$

[Relationship Between Average Flow Velocity in Main Flow Path and Average Flow Velocity in Bypass Flow Path]

Figure 8A:
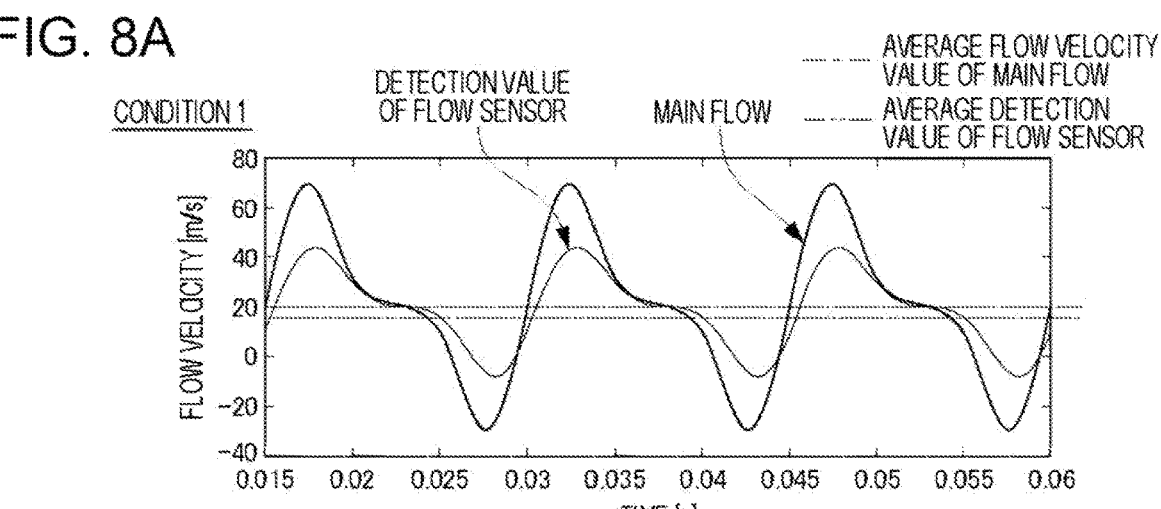
FIGS. 8A to 8C is a graph representing a relationship between an average flow velocity in a main flow path and an average flow velocity in a bypass flow path measured by a flow sensor in different pulsating flows.
Figure 8B:
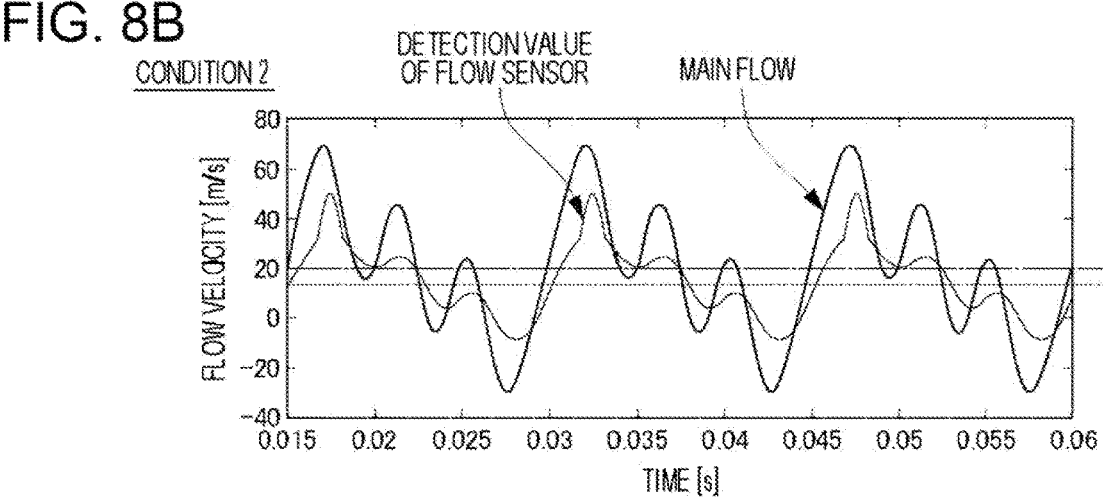
Figure 8C:
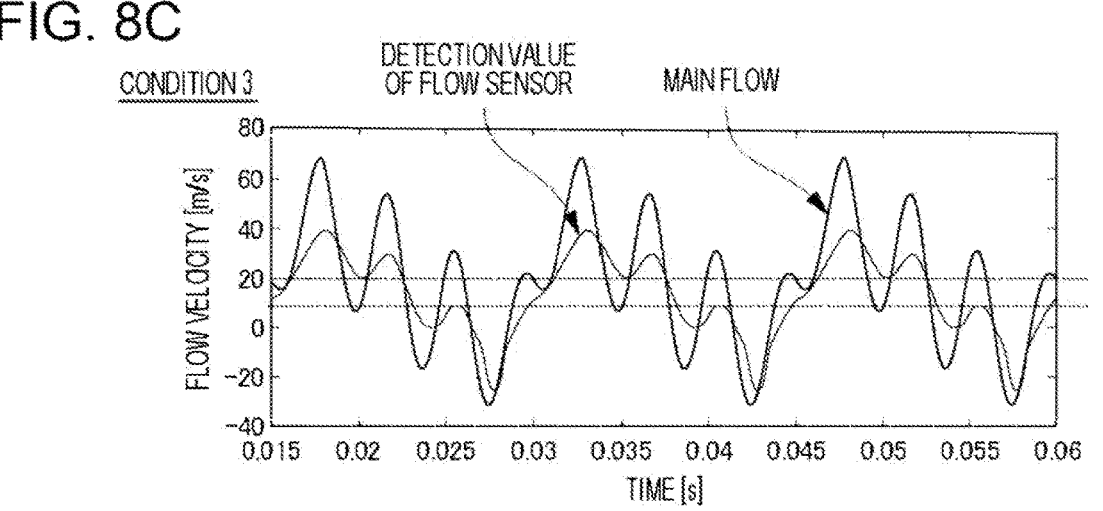

FIGS. 8A to 8C are graphs representing the relationship between the average flow velocity in the main flow path and the average flow velocity in the bypass flow path measured by the flow sensor 2 in different pulsating flows. Conditions 1 to 3 are different operation conditions. However, the average flow velocity value and the pulsation amplitude ratio of the main flow in each condition are the same for all the pulsating flows in the conditions 1 to 3.

The bypass flow path has a smaller inner diameter (d) than the main flow path and includes a bent shape, and thus has a larger pressure loss. The characteristics change in the frequency, the absolute value of the flow velocity, and the flow velocity direction due to drift in the main flow path, drift in the bypass flow path, resonance, response delay of the flow sensor 2, and the like. As a result, as illustrated in the drawing, the flow velocity in the main flow path and the flow velocity in the bypass flow path measured by the flow sensor 2 are not the same, and an error occurs. As shown in the conditions 1 to 3, when the pulsation waveform is different, even when the average flow velocity value of the main flow during a predetermined period (e.g., a period of three cycles) is the same (20 m/s), the average flow velocity of the main flow path and the average flow velocity of the bypass flow path measured by the flow sensor 2 during the predetermined period show different values. Therefore, it is necessary to adapt the pulsation correction amount in accordance with the pulsation conditions (influencing factors).

[Average Flow Velocity Value of Main Flow and Detected Average Flow Velocity Value of Flow Sensor]

Figure 9:
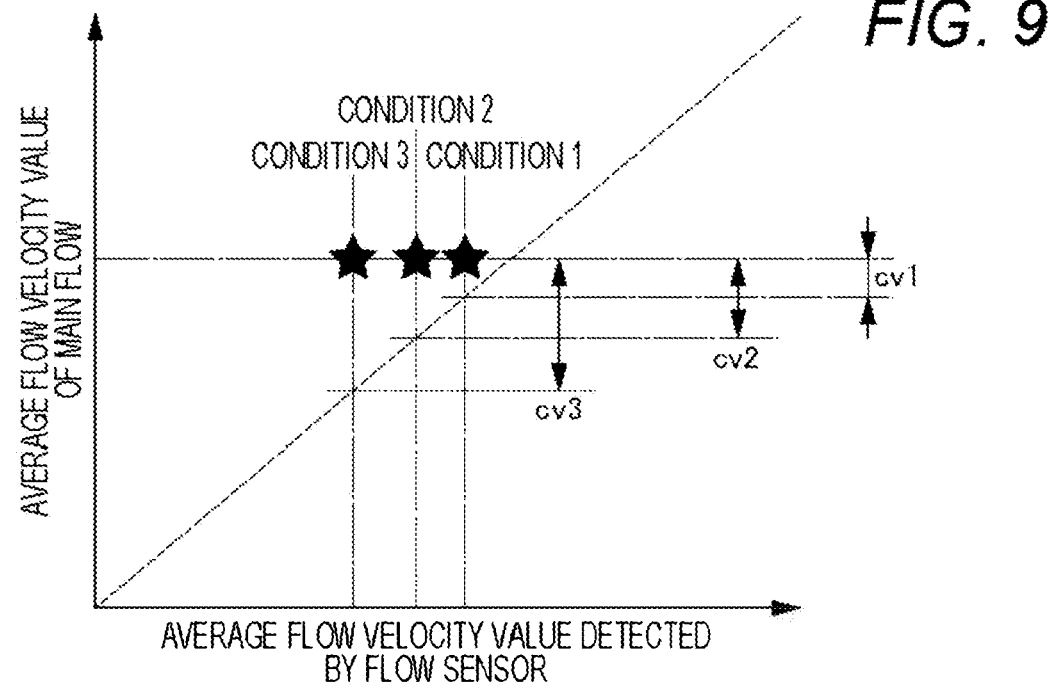
FIG. 9 is a graph representing a difference among the detection errors (correction amounts) of the flow sensor in the different pulsating flows.

FIG. 9 is a graph representing a difference among the detection errors (correction amount) of the flow sensor 2 in the different pulsating flows. The horizontal axis represents the average flow velocity value detected by the flow sensor 2, and the vertical axis represents the average flow velocity value of the main flow.

Even when the average flow velocity value of the main flow is the same, the average flow velocity value detected by the flow sensor 2 differs for each of the pulsation conditions 1 to 3. Therefore, for the pulsation conditions 1 to 3, the correction amounts cv1 to cv3, which correspond to the detection errors of the flow sensor 2 relative to the average flow velocity value of the main flow, are different.

[General Pulsation Correction Map]

Figure 10A:
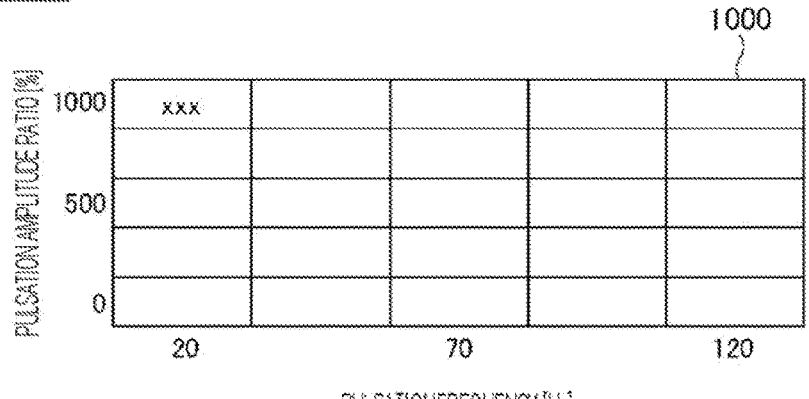
FIGS. 10A and 10B are examples of a general pulsation correction map for correcting the detection error of the flow sensor.
Figure 10B:
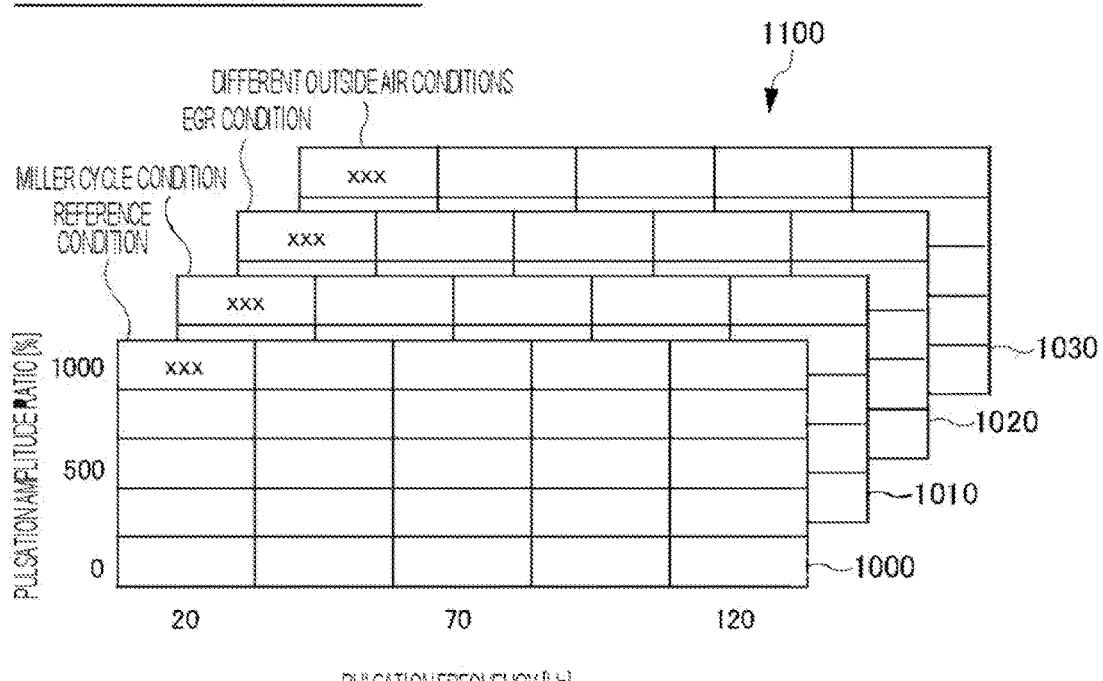

FIGS. 10A and 10B are examples of a general pulsation correction map for correcting the detection error of the flow sensor 2 caused by the pulsation phenomenon. In the pulsation correction map, a pulsation frequency [Hz] is set in the horizontal direction, and a pulsation amplitude ratio [%] is set in the vertical direction.

In the pulsation correction map adaptation, a fundamental frequency (=pulsation frequency) is determined from the rotational speed of the internal combustion engine 1, and a frequency equal to or higher than the fundamental frequency is regarded as a pulsation component. The pulsation amplitude ratio is obtained from the amplitude (between the maximum value and the minimum value) of a signal with the fundamental frequency, obtained by a low-pass filter that passes the band of the fundamental frequency or less, and the average value of the signal, and the pulsation correction amount is recorded in a pulsation correction map 1000 with the pulsation frequency and the pulsation amplitude ratio as axes. At the time of in-vehicle operation, based on the detection value and the rotational speed of the flow sensor 2, the pulsation frequency and the pulsation amplitude ratio are obtained, and based on the pulsation correction amount corresponding to those obtained, the detection value of the flow sensor 2 is corrected.

As described in FIGS. 8 and 9, the adapted value of the pulsation correction changes under the influence of the pulsation waveform, so that it is necessary to provide a multidimensional pulsation correction map for each influencing factor that affects the pulsation waveform. In the lower part of FIGS. 10A and 10B, a multidimensional pulsation correction map 1100 is illustrated. The multidimensional pulsation correction map 1100 includes the pulsation correction map 1000 for the reference condition, a pulsation correction map 1010 for a certain Miller cycle condition, a pulsation correction map 1020 for a certain EGR condition, and a pulsation correction map 1030 for different outside air conditions. For example, the reference condition is a condition in which the Miller cycle control and the EGR control are not performed in certain outside air conditions.

For example, the outside air condition is an influencing factor of the pulsation waveform since affecting the speed of the sound wave. Thus, the multidimensional pulsation correction map 1100 needs to include the pulsation correction map 1030 in which assumed outside air conditions such as air temperature and atmospheric pressure are different.

In addition, there are intermediate states in the Miller cycle control and the EGR control, and hence it is necessary to appropriately interpolate the intermediate states. For example, when the EGR condition of the pulsation correction map 1020 is an EGR rate of 30%, the pulsation correction amount when the EGR rate is 10% is obtained as the intermediate state by interpolation using each of the correction amounts of the pulsation correction map 1000 for the reference condition (EGR rate of 0%) and the pulsation correction map 1020 for the EGR condition of 30%. For the outside air conditions, it is also advisable to obtain the pulsation correction amount suitable for the current outside air conditions by interpolation.

First Embodiment

Hereinafter, a method for correcting the detection error of the flow sensor 2 caused by a pulsation phenomenon based on a position of an average value between a maximum value and a minimum value of a pulsation waveform will be described as a first embodiment.

[Maximum Value, Minimum Value, and Average Value of Flow Sensor Output Signal]

Figure 11A:
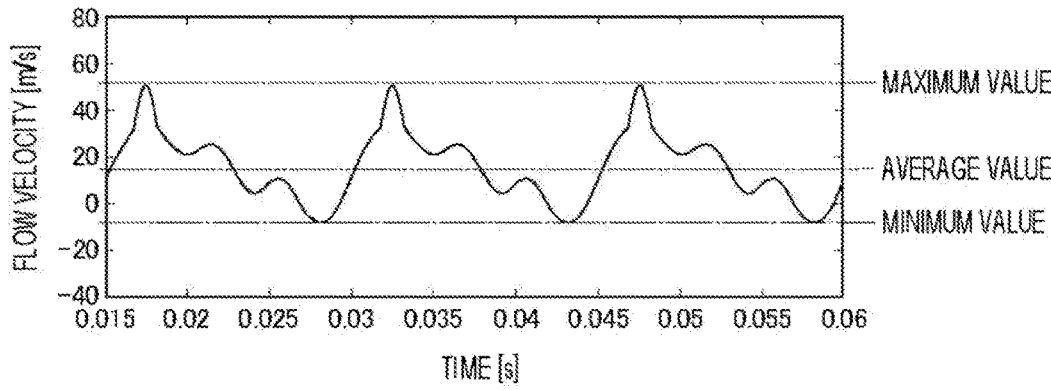
FIGS. 11A and 11B are graphs representing examples of a maximum value, a minimum value, and an average value of an output signal of the flow sensor in each of different pulsating flows.
Figure 11B:
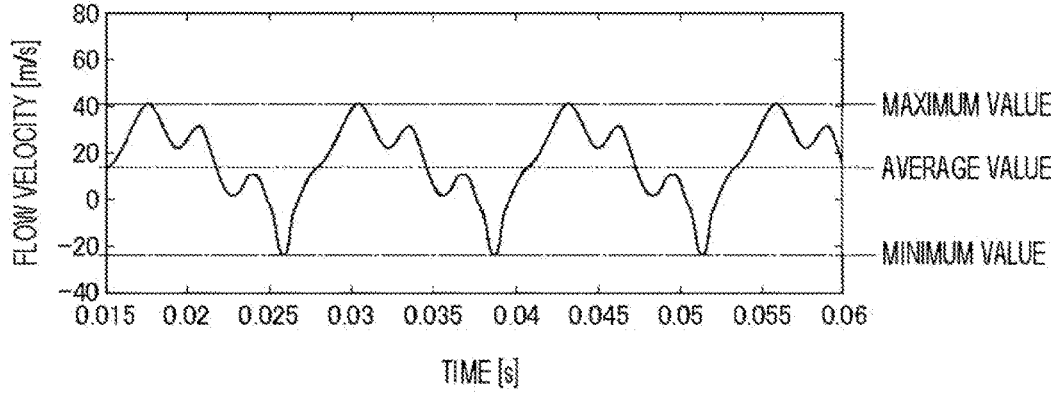

FIGS. 11A and 11B are graphs representing examples of the maximum value, the minimum value, and the average value of the output signal of the flow sensor 2 in each of different pulsating flows.

As illustrated in FIGS. 11A And 11B, the relative position of the average value relative to the maximum value and the minimum value, that is, the position of the average value between the maximum value and the minimum value, changes depending on the waveform (pulsation waveform)

of the output signal of the flow sensor 2. In the pulsation waveform in the upper part of FIGS. 11A and 11B, the position of the average value (20 m/s) is closer to the minimum value. In the pulsation waveform in the lower part of FIGS. 11A and 11B, the position of the average value (20 m/s) is closer to the maximum value because the waveform around the minimum value is sharp, although the minimum value is smaller than that in the pulsation waveform in the upper part.

Therefore, in the present embodiment, the pulsation correction map is created using the fact that the position of the average value between the maximum value and the minimum value changes in accordance with the waveform (pulsation waveform) of the output signal of the flow sensor 2 as described above. Specifically, instead of having the multidimensional pulsation correction map 1100 for each influencing factor that affects the pulsation waveform as illustrated in the lower part of FIGS. 10A and 10B, the pulsation correction map is created using the position of the average value between the maximum value and the minimum value of the pulsation waveform of the flow rate detected by the flow sensor 2 as a parameter.

[Pulsation Correction Map Considering Position of Average Value Relative to Maximum Value and Minimum Value]

Figure 12:
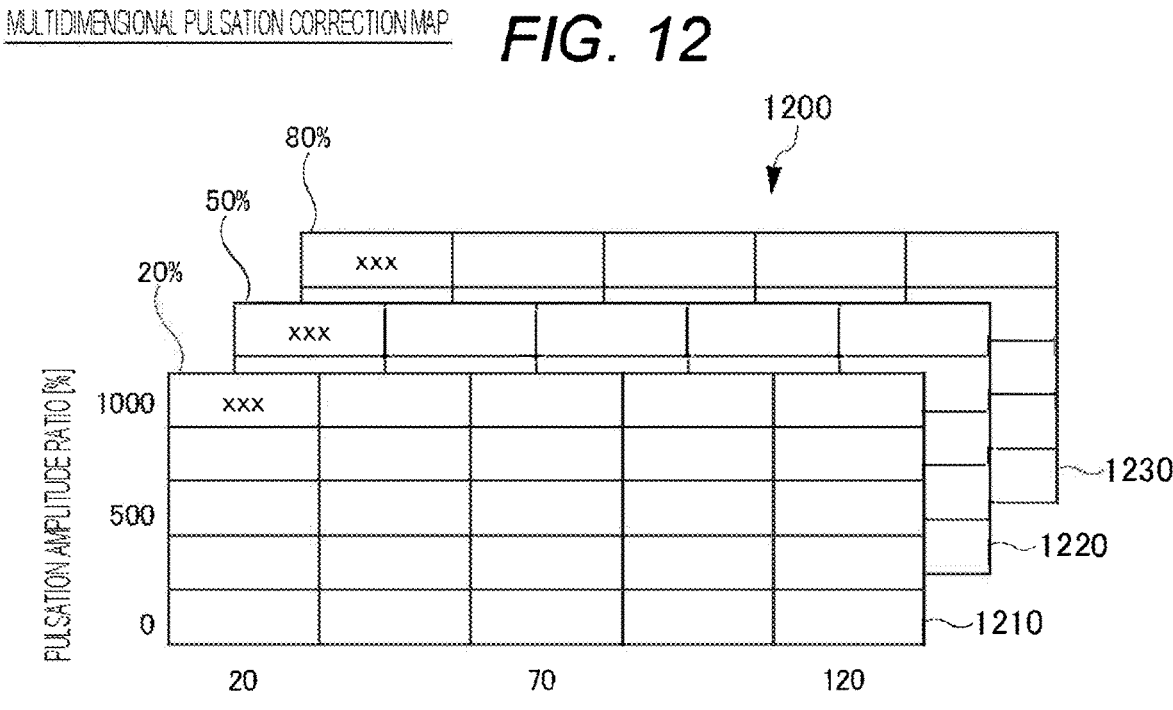
FIG. 12 is an example of a multidimensional pulsation correction map that corrects the detection error of the flow sensor according to the first embodiment of the present invention using a position of an average value between a maximum value and a minimum value of a pulsation waveform as a parameter.

FIG. 12 illustrates an example of the multidimensional pulsation correction map that corrects the detection error of the flow sensor 2 caused by the pulsation phenomenon using the position of the average value between the maximum value and the minimum value of the pulsation waveform as a parameter. In a multidimensional pulsation correction map 1200 illustrated in FIG. 12, a pulsation frequency [Hz] is set in the horizontal direction, and a pulsation amplitude ratio [%] is set in the vertical direction. Here, in the pulsation waveform, the position of the minimum value is set to 0%, and the position of the maximum value is set to 100%. The multidimensional pulsation correction map 1200 includes a pulsation correction map 1210 in which the position of the average value between the maximum value and the minimum value is 20%, a pulsation correction map 1220 in which the position is 50%, and a pulsation correction map 1230 in which the position is 80%.

According to the first embodiment described above, the pulsation correction maps 1210 to 1230 with the pulsation frequency and the pulsation amplitude ratio as axes are prepared for the positions of the average value between the maximum value and the minimum value of the output signal of the flow sensor 2, and the correction value is acquired from the pulsation correction maps 1210 to 1230 to correct the detection error of the flow sensor 2. This makes it possible to accurately obtain the flow rate of the intake air even in an operation condition of the internal combustion engine 1 in which various pulsations occur in the flow of the intake air at the position of the flow sensor, such as when the Miller cycle control or the EGR control is performed. Therefore, it is possible to prevent deterioration in the exhaust gas property and deterioration in the fuel consumption of the internal combustion engine 1, which are concerned at the time of large pulsation.

Further, according to the present embodiment, the number of pulsation correction maps can be reduced compared to the case of preparing the multidimensional pulsation correction map 1100 (cf. FIGS. 10A and 10B) for each influencing factor that affects the pulsation waveform.

Second Embodiment

Next, as a second embodiment, a method for realizing the calculation of the pulsation correction amount based on features of pulsation waveforms by a neural network model will be described with reference to FIGS. 13A to 15B.

[Method for Extracting Pulsation Feature]

FIGS. 13A and 13B are explanatory diagrams illustrating a method for extracting features of pulsation waveforms.

Features of pulsation waveforms illustrated in the lower part of FIGS. 13A and 13B are extracted relative to an output signal (flow velocity data) of the flow sensor 2 illustrated in the upper part of FIGS. 13A and 13B. As an example, the waveform (pulsation waveform) of the output signal of the flow sensor 2 illustrated in the upper part of FIGS. 13A and 13B is the same as the waveform in the lower part of FIGS. 8A to 8C. There is a difference between the average flow velocity value (overlined U) of the main flow path and the average value (overlined u) detected by the flow sensor 2.

In the extraction of the pulsation features, the processing of obtaining an average value p, a maximum value max, and a minimum value min of the output signal of the flow sensor 2 during a period defined by the rotational speed of the internal combustion engine 1 is performed, and filter processing is performed using bandpass filters (1) to (4) with different frequencies. By applying the processing of the bandpass filters (1) to (4) with different frequencies to the detection result of the flow sensor 2, amplitudes σ1 to σ4 for the waveforms of different frequency bands are obtained. The pulsation features are associated with a pulsation correction amount δ (overlined U/overlined u).

For example, the frequency band passing through the bandpass filter (1) is a band including the fundamental frequency included in the output signal of the flow sensor 2. The passbands of the bandpass filters (2), (3), (4) are bands including second-harmonic, third-harmonic, and fourth-harmonic frequencies. However, the passband of the bandpass filter (1) may not be a band including the fundamental frequency. Similarly, the passbands of the bandpass filters (2) to (4) may not be bands including harmonic frequencies.

Although the four bandpass filters (1) to (4) are provided, the number of bandpass filters only needs to be one or more. Note that a bandpass filter to be used may be selected from among a plurality of bandpass filters based on a predetermined rule, or a fixed number of bandpass filters may be used. For example, although a plurality of bandpass filters are set in FIGS. 13A and 13B, one bandpass filter may actually perform the filter processing. However, the accuracy of the pulsation correction amount is improved by using the results of the filter processing by the plurality of bandpass filters.

[Weight, Bias, and Activation Function of Each Neuron]

Figure 14:
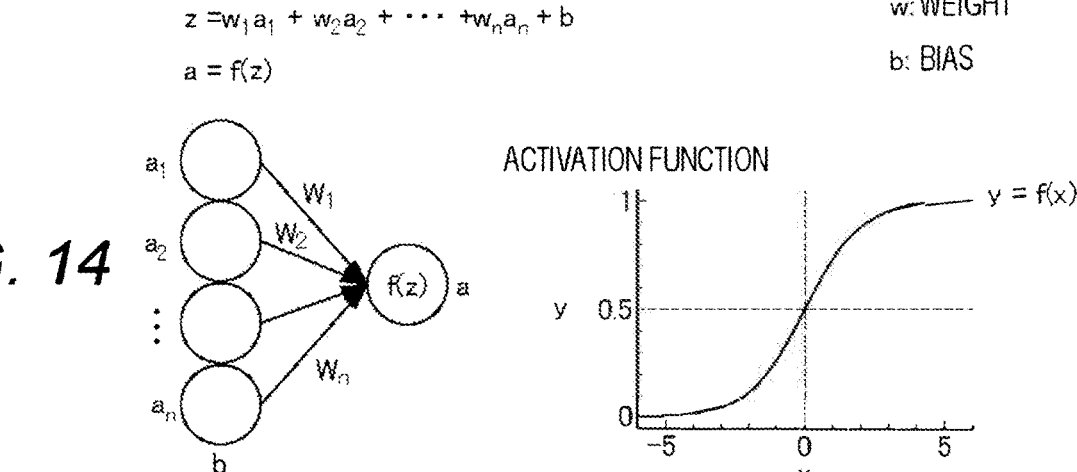
FIG. 14 is a schematic diagram illustrating weights and a bias of each neuron constituting a neural network model.

FIG. 14 is a schematic diagram illustrating weights and a bias of each neuron constituting a neural network model.

The neural network model is a mathematical model imitating a mechanism of a human cranial nerve circuit. A neural network is often used as a means for performing deep learning in machine learning. For example, backpropagation can be applied to a machine learning algorithm. Although the neural network is used in the present embodiment, the present invention is not limited to this example so long as the detection error of the flow sensor 2 can be corrected by machine learning.

As illustrated in FIG. 14, a weight w and a bias b are set to each neuron (unit) constituting the neural network model. Inputs $a_1$ to $a_n$ are respectively input to n neurons, and weights $w_1$ to set for the respective neurons are multiplied. Then, the inputs $a_1$ to $a_n$ multiplied by the weights $w_1$ to w n are added (combined) in a neuron in the next layer, and an output z is obtained by adding the bias b to the addition result. The neuron in the next layer outputs a, which is represented by a function f(z).

Further, a function called an activation function is defined for each neuron. A logistic function (sigmoid function), a ramp function (ReLU function), or the like is appropriately set as the activation function. FIG. 14 illustrates an example in which the larger the input x is than 0, the more the neuron is activated and the closer the output y (=f(x)) is to 1, and the smaller the input x is than 0, the more the neuron is deactivated and the closer the output y (=f(x)) is to 0. For example, when the input x is "5", the output y of the activation function is "1", and "1" is output from the neuron to a neuron in the next layer.

[Neural Network]

Figure 15A:
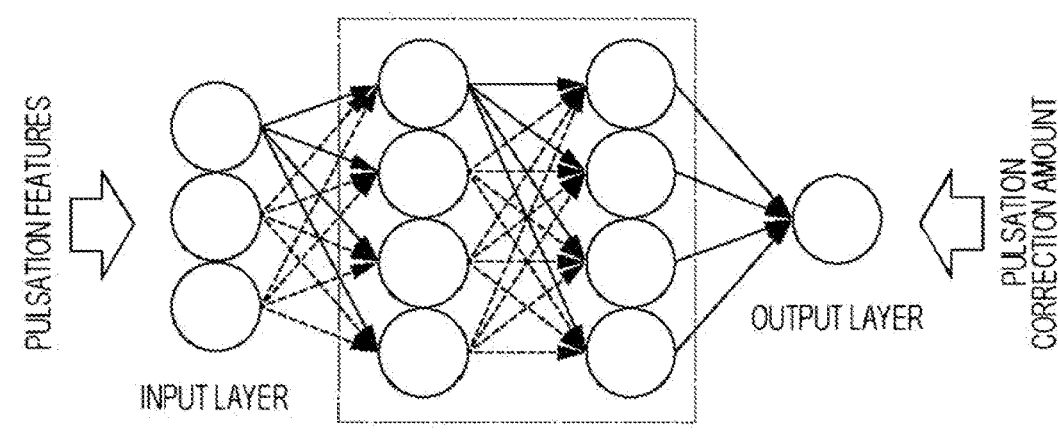
FIGS. 15A and 15B are explanatory diagrams illustrating a method for realizing, by the neural network model, the calculation of the pulsation correction amount based on the features of the pulsation waveforms according to the second embodiment of the present invention.
Figure 15B:
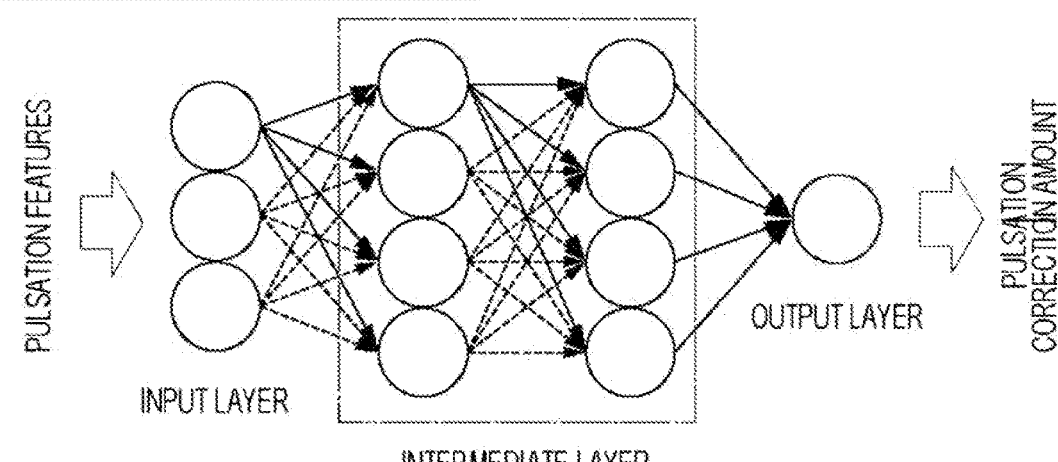

FIGS. 15A and 15B are explanatory diagrams illustrating a method for realizing the calculation of the pulsation correction amount based on the features of the pulsation waveforms by the neural network model.

In the neural network model, one layer is formed of a plurality of neurons, and an intermediate layer is set between an input layer and an output layer. By increasing the number of neurons and the number of layers in the intermediate layer, a more complicated input-output relationship can be approximated. There is a trade-off relationship between the approximate accuracy and the model scale, and a compatible point satisfying both requirements is selected.

The input-output relationship can be approximated by setting the pulsation features illustrated in FIGS. 13A and 13B in the input layer, setting the adaptation result of the pulsation correction amount in the output layer, and performing machine learning (supervised) on the weight w and the bias b. The pulsation features are the average value μ, the maximum value max, and the minimum value min of the output signal of the flow sensor 2 and the amplitudes of σ1 to σ4 of the respective frequency components of the pulsation waveforms during a predetermined period (a feature detection period in FIG. 16). The adaptation result of the pulsation correction amount is the pulsation correction amount δ. When the pulsation features are input, a learned model learned as described above performs calculation based on the learning content and outputs the pulsation correction amount as a calculation result.

In the present embodiment, the position of the average value between the maximum value and the minimum value of the pulsation waveform and the amplitude of one or a plurality of frequency components included in the pulsation waveform are associated with the pulsation correction amount, whereby it is possible to determine the pulsation correction amount corresponding to the difference in the position of the average value as in the case of using the multidimensional pulsation correction map 1200 illustrated in FIG. 12.

[Pulsation Correction Logic]

Figure 16:
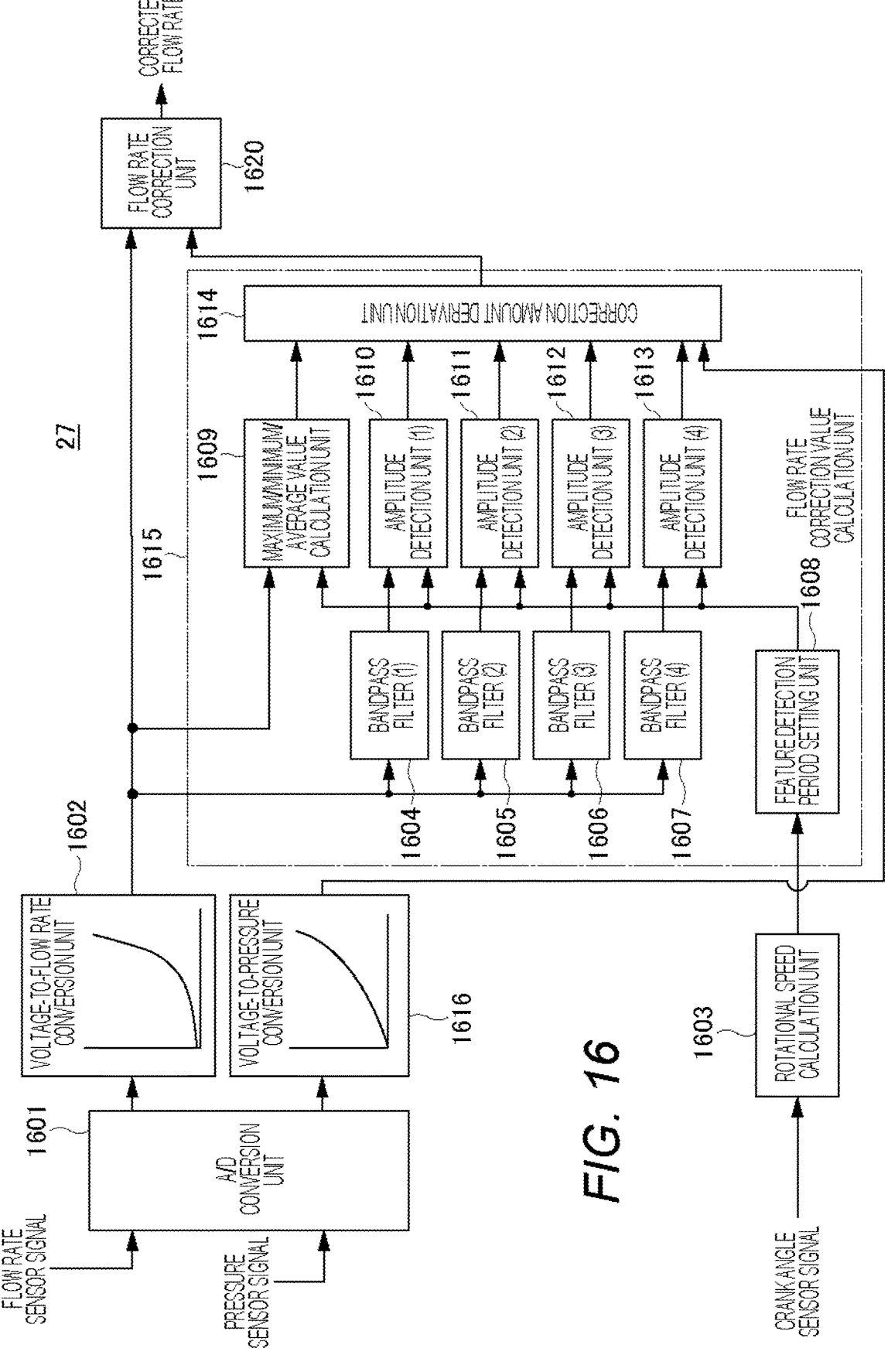
FIG. 16 is a block diagram illustrating an example of a pulsation correction logic that is mounted in an ECU and corrects a detection error of a flow sensor according to a second embodiment of the present invention.

FIG. 16 is a block diagram illustrating an example of a pulsation correction logic that is mounted in the ECU 27 and corrects the detection error of the flow sensor 2. The ECU 27 and the flow sensor 2 constitute a flow rate measurement system.

First, the principle of a hot-wire flow sensor employed in the flow sensor 2 will be described. The hot-wire flow sensor has a heating resistive element disposed in an airflow to be measured as a main constituent element. In the hot-wire flow sensor, a bridge circuit is configured so that a value of a current flowing through the heating resistive element increases when the amount of intake air is large, and decreases when the amount of intake air is small. The hot-wire flow sensor extracts the amount of air as a voltage signal by the current flowing through the heating resistive element.

The ECU 27 includes an A/D conversion unit 1601, a voltage-to-flow rate conversion unit 1602, a rotational speed calculation unit 1603, a flow rate correction value calculation unit 1615, a voltage-to-pressure conversion unit 1616, and a flow rate correction unit 1620. The flow rate correction value calculation unit 1615 includes bandpass filters 1604 to 1607, a feature detection period setting unit 1608, a maximum/minimum/average value calculation unit 1609, amplitude detection units 1610 to 1613, and a correction amount derivation unit 1614.

The A/D conversion unit 1601 converts analog voltage signals output from the flow sensor 2 and the boost pressure sensor 9 into digital voltage signals by an A/D conversion unit. The A/D conversion unit 1601 outputs the digital voltage signals to the voltage-to-flow rate conversion unit 1602 and the voltage-to-pressure conversion unit 1616.

The voltage-to-flow rate conversion unit 1602 converts the digital voltage signal into a flow rate signal (flow rate value) using the voltage-to-flow rate conversion table, and outputs the calculation result to each of the bandpass filters 1604 to 1607 and the maximum/minimum/average value calculation unit 1609 of the flow rate correction value calculation unit 1615, and the flow rate correction unit 1620.

In the present embodiment, a system in which a voltage signal corresponding to the amount of air is output as a voltage value has been employed, but there is also a system in which a voltage signal is converted into a frequency signal by a voltage/frequency conversion circuit (not illustrated) and output. In a case where the signal is input as a frequency signal obtained by voltage/frequency conversion, the period of the signal is measured using the port input of the CPU 31a, whereby the period or a value converted from the period into a frequency becomes an input. In an air amount conversion table referred to by the voltage-to-flow rate conversion unit 1602, a search is performed from values stored in advance in accordance with the period or the frequency, and when there is no value adapted, interpolation calculation is performed for conversion into the amount of air detected.

The characteristic curve of the voltage-to-flow rate conversion unit 1602 illustrated in FIG. 16 illustrates the relationship between the amount of intake air and an output signal of a general hot-wire flow sensor. This characteristic curve is a characteristic curve having a nonlinear relationship in which the voltage of the output signal is low when the amount of intake air is small, and the voltage of the output signal is high when the amount of intake air is large. The reason for the nonlinearity characteristic is that the following equation (3), called King's equation, is mainly employed for an air amount Q when a detection signal from the heating resistive element is converted into the amount of air.

$$Ih \cdot Rh = (\alpha + \beta \cdot \sqrt{Q}) \cdot (Th - Ta) \tag{3}$$

Here, Ih is the current value of the heating resistive element, Rh is the resistance value of the heating resistive element, Th is the surface temperature of the heating resistive element, Ta is the temperature of air, Q is the amount of air, and α and β are constants determined by specifications of the heating resistive element. In general, the current value Ih of the heating resistive element is controlled so that (Th—Ta) is constant, and hence the amount of air is converted into a voltage value V by the voltage drop of the resistor and detected, resulting in that the voltage value V is a quartic function equation. Therefore, when the detection signal from the heating resistive element is converted into the amount of air, the curvature of the quartic curve, that is, the relationship between the output and the amount of air, becomes nonlinear.

The voltage-to-pressure conversion unit 1616 converts the digital voltage signal into a pressure signal by the voltage/pressure conversion table, and outputs the conversion result to the correction amount derivation unit 1614 of the flow rate correction value calculation unit 1615. Similarly to the voltage-to-flow rate conversion unit 1602, the voltage-to-pressure conversion unit 1616 employs a system in which a voltage signal corresponding to pressure is output as a voltage value. However, the voltage-to-pressure conversion unit 1616 may be configured to obtain a pressure signal from a frequency signal converted from a digital voltage signal by a voltage/frequency conversion circuit (not illustrated).

The rotational speed calculation unit 1603 calculates the rotational speed of the internal combustion engine 1 based on the output signal of the crank angle sensor 18 and outputs the calculation result to the feature detection period setting unit 1608 of the flow rate correction value calculation unit 1615.

The bandpass filters 1604 to 1607 perform bandpass filter processing of different pass frequency bands on the flow rate signal input from the voltage-to-flow rate conversion unit 1602. The bandpass filters 1604 to 1607 output the filtered flow rate signals to the corresponding amplitude detection units 1610 to 1613, respectively. The bandpass filters 1604 to 1607 correspond to the bandpass filters (1) to (4) of FIGS. 13A and 13B. By providing the plurality of bandpass filters 1604 to 1607, various features of the output signal (pulsation waveform) of the flow sensor 2 can be used, improving the inference accuracy of the pulsation correction amount.

Although FIG. 16 illustrates an example of the four bandpass filters 1604 to 1607, the number of bandpass filters may be other than four, that is, one to three, or five or more. In the following description, the bandpass filters 1604 to 1607 may be referred to as bandpass filters (1) to (4).

The feature detection period setting unit 1608 determines a feature detection period for detecting a feature from the rotational speed input from the rotational speed calculation unit 1603 and outputs the determined feature detection period to each of the maximum/minimum/average value calculation unit 1609 and the amplitude detection units 1610 to 1613. The feature detection period is a period synchronized with the intake interval of the internal combustion engine 1 or a period that is an integral multiple of the synthesized period. For example, in the four-cycle engine, the feature detection period of each cylinder is desirably set to a period of one or more cycles of the internal combustion engine 1. FIGS. 13A and 13B illustrates an example in which the pulsation feature is extracted in a period of 3 cycles. The feature detection period is determined by the rotational speed of the internal combustion engine 1 and the number of cylinders, but may be set for each predetermined crank angle.

The maximum/minimum/average value calculation unit 1609 calculates the average value, the maximum value, and the minimum value of the output signal (pulsation waveform) of the flow sensor 2 within the feature detection period and outputs the calculation results to the correction amount derivation unit 1614. As a method for calculating the average value, in addition to time averaging, arithmetic averaging, filter processing, a DC component of Fourier transform, and the like can be used. For example, the filter processing is weighted averaging, harmonic averaging, or the like.

The amplitude detection units 1610 to 1613 detect the amplitudes of the flow sensor signals having passed through the respective bandpass filters 1604 to 1607 within the feature detection period and outputs the detection results to the correction amount derivation unit 1614. Hereinafter, the amplitude detection units 1610 to 1613 may be referred to as amplitude detection units (1) to (4).

As described above, the flow rate correction value calculation unit 1615 includes the one or more bandpass filters 1604 to 1607 each provided corresponding to any of the one or more frequencies included in the output signal of the flow sensor 2 and the one or more amplitude detection units 1610 to 1613 that are provided corresponding to the one or more bandpass filters and calculate the amplitudes of the output signals having passed through the corresponding bandpass filters. It is thereby possible to extract a plurality of frequency components from the output signal of the flow sensor 2 and calculate the amplitudes of the frequency components.

The correction amount derivation unit 1614 calculates the pulsation correction amount using the neural network model (learned model) described in FIGS. 15A and 15B from the calculation results of the maximum/minimum/average value calculation unit 1609 and the detection results of the amplitude detection units (1) to (4) and outputs the calculation result to the flow rate correction unit 1620. Further, the correction amount derivation unit 1614 calculates the maximum value, the minimum value, and the amplitude of the pressure signal input from the voltage-to-pressure conversion unit 1616 and determines whether to perform the pulsation correction illustrated in FIG. 17 based on the calculation result.

Based on the flow rate signal (pre-correction flow rate) input from the voltage-to-flow rate conversion unit 1602 and the pulsation correction amount input from the correction amount derivation unit 1614, the flow rate correction unit 1620 corrects the pre-correction flow rate. The ECU 27 controls the fuel injection amount, the ignition timing, and the like using the flow rate (corrected flow rate) of the intake air corrected by the flow rate correction unit 1620.

The flow rate correction value calculation unit 1615 and the flow rate correction unit 1620 perform calculation in a period synchronized with the intake interval (cycle) of the internal combustion engine 1. Thus, the correction value of the pulsation is calculated, and the flow rate of the intake air is corrected based on the correction value, in the period synchronized with the intake interval of the internal combustion engine, for example, every cycle. Note that the flow rate correction unit 1620 and the flow rate correction unit 1620 may be configured as one block.

By providing the function of correcting the detection error caused by the pulsation of the flow sensor 2 as described above, the detection error of the flow sensor can be appropriately corrected even in an operation condition of the internal combustion engine 1 in which the detection error of the flow sensor 2 is likely to occur due to pulsation. This ensures the detection accuracy of the flow sensor 2 and improves the accuracy of the air-fuel ratio control. By performing the air-fuel ratio control with high accuracy, it is possible to prevent deterioration in the exhaust gas of the internal combustion engine 1.

As described above, the pulsation correction amount can also be obtained based on the multidimensional pulsation correction map 1200 (cf. FIG. 12) with the pulsation amplitude ratios for the pulsation frequencies set as the respective axes. In this case, the correction amount derivation unit 1614 acquires the rotational speed (pulsation frequency) from the rotational speed calculation unit 1603 or the feature detection period setting unit 1608. The maximum/minimum/average value calculation unit 1609 calculates the position of the average value between the maximum value and the minimum value of the flow rate signal and the pulsation amplitude ratio and outputs the calculation results to the correction amount derivation unit 1614. The correction amount derivation unit 1614 searches the multidimensional pulsation correction map 1200 based on the pulsation frequency, the pulsation amplitude ratio, and the position of the average value to determine an adapted pulsation correction amount.

[Pulsation Correction Processing]

Figure 17:
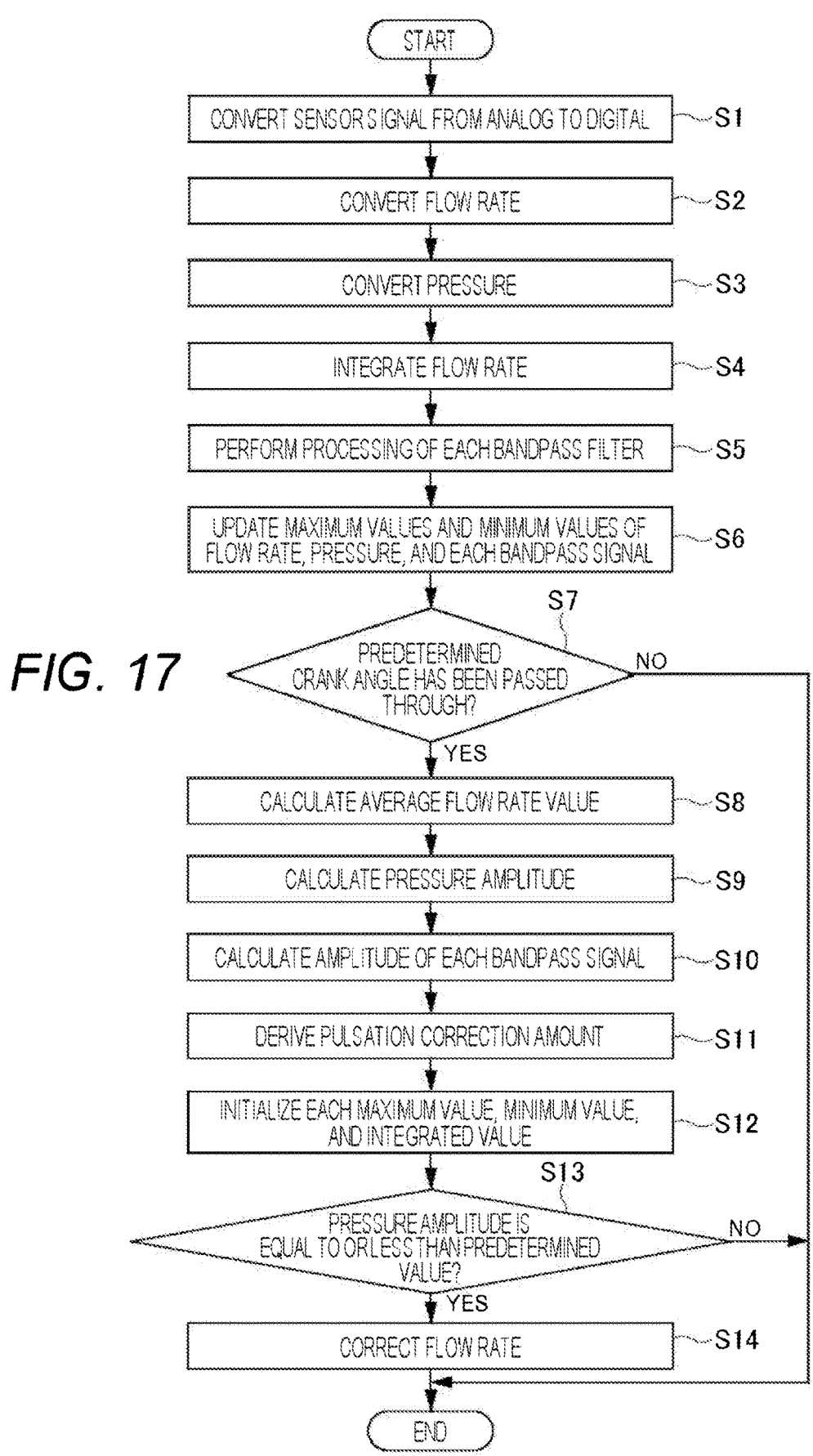
FIG. 17 is a flowchart illustrating an example of a procedure for the pulsation correction of the flow sensor by the ECU according to the second embodiment of the present invention.

FIG. 17 is a flowchart illustrating an example of a procedure for the pulsation correction of the flow sensor 2 by the ECU 27. The processing of each step illustrated in FIG. 17 is performed every fixed period, for example, every 1 ms.

First, the A/D conversion unit 1601 converts an analog voltage signal output from the flow sensor 2 and an analog voltage signal output from the boost pressure sensor 9 disposed downstream of the throttle valve 7 into digital voltage signals from the analog voltage signals (S1).

Next, the voltage-to-flow rate conversion unit 1602 converts the digital voltage signal generated by the A/D conversion of the analog voltage signal of the flow sensor 2 into a flow rate signal (S2).

The voltage-to-pressure conversion unit 1616 converts the digital voltage signal generated by the A/D conversion of the analog voltage signal of the boost pressure sensor 9 into a pressure signal (S3).

Next, the maximum/minimum/average value calculation unit 1609 integrates the flow rate based on the flow rate signal calculated in step S2 during a feature detection period set by the feature detection period setting unit 1608 in order to calculate the average value of the flow rate signal (S4).

Next, the plurality of bandpass filters (1) to (4) perform bandpass filter processing on the flow rate signals input from the voltage-to-flow rate conversion unit 1602 (S5).

Next, the maximum/minimum/average value calculation unit 1609 updates the maximum value and the minimum value (corresponding to max and min in FIGS. 13A and 13B) of the flow rate signal and the maximum value and the minimum value of the pressure signal during the feature detection period. The amplitude detection units (1) to (4) update the maximum values and the minimum values of the flow rate signals having passed through the respective bandpass filters (1) to (4) (S6).

Next, the maximum/minimum/average value calculation unit 1609 determines whether the crankshaft has passed through a preset crank angle position based on the output signal of the crank angle sensor 18 (S7). The predetermined crank angle is, for example, a compression top dead center of each cylinder of the internal combustion engine 1. When the maximum/minimum/average value calculation unit 1609 determines that the crankshaft has passed the predetermined crank angle (YES in S7), the ECU 27 performs the processing of step S8 and subsequent steps. On the other hand, when the crankshaft has not passed through the predetermined crank angle (NO in S7), the processing of this flowchart is terminated.

Next, the maximum/minimum/average value calculation unit 1609 calculates an average flow rate value (corresponding to μ in FIGS. 13A and 13B) during the feature detection period from the integrated flow rate value obtained in step S4 (S8). Next, the correction amount derivation unit 1614 calculates a pressure amplitude from the maximum value and the minimum value of the pressure signal obtained in step S6 (S9). Note that the flow rate correction value calculation unit 1615 may include an amplitude detection unit (not illustrated) that calculates the pressure amplitude from the maximum value and the minimum value of the pressure signal, and the pressure amplitude calculated by the amplitude detection unit may be input to the correction amount derivation unit 1614.

Next, the amplitude detection units (1) to (4) calculate the amplitudes (corresponding to $\sigma 1$ to $\sigma 4$ in FIGS. 13A and 13B) of the flow rate signals having passed through the respective bandpass filters (1) to (4) using the maximum values and the minimum values of the flow rate signals having passed through the respective bandpass filters (1) to (4) obtained in step S6 (S10).

Next, the correction amount derivation unit 1614 derives the pulsation correction amount (corresponding to 5 in FIGS. 13A and 13B) based on the pulsation correction method illustrated in FIGS. 13A to 15B (S11). That is, the correction amount derivation unit 1614 inputs the maximum value and the minimum value of the flow rate signal obtained in step S6, the average value of the flow rate signal obtained in step S8, and the amplitudes of the flow rate signals having passed through the respective bandpass filters (1) to (4) obtained in step S10 to the learned model to obtain the pulsation correction amount.

Next, the ECU 27 initializes the maximum value, the minimum value, and the integrated value of the flow rate signal and the maximum value and the minimum value of the pressure signal for the next calculation (S12).

Next, the correction amount derivation unit 1614 determines whether the pressure amplitude obtained in step S9 is equal to or less than a predetermined value (S13). When the pressure amplitude exceeds the predetermined value (NO in S13), the processing of this flowchart is terminated.

When the pressure amplitude is equal to or less than the predetermined value (YES in S13), the flow rate correction unit 1620 multiplies the average value (corresponding to the overlined u in FIGS. 13A and 13B) of the flow rate signal obtained in step S8 by the pulsation correction amount (corresponding to δ in FIGS. 13A and 13B) obtained in step S11 corrects the flow rate (S14). By such a series of processing, the flow rate (overlined U in FIGS. 13A and 13B) of the main flow is obtained. The ECU 27 periodically and repeatedly performs a series of processing of the flowchart illustrated in FIG. 17 for each cylinder of the internal combustion engine 1.

In this flowchart, it has been described that the entire processing is performed every fixed period, but the processing after step S8 may be separately performed as processing synchronized with the crank angle. That is, step S8 and subsequent steps may be configured as interrupt processing synchronized with the crank angle.

[Changes in Throttle Valve Opening, Boost Pressure Sensor Detection Value, and Detection Value of Flow Sensor]

Figure 18:
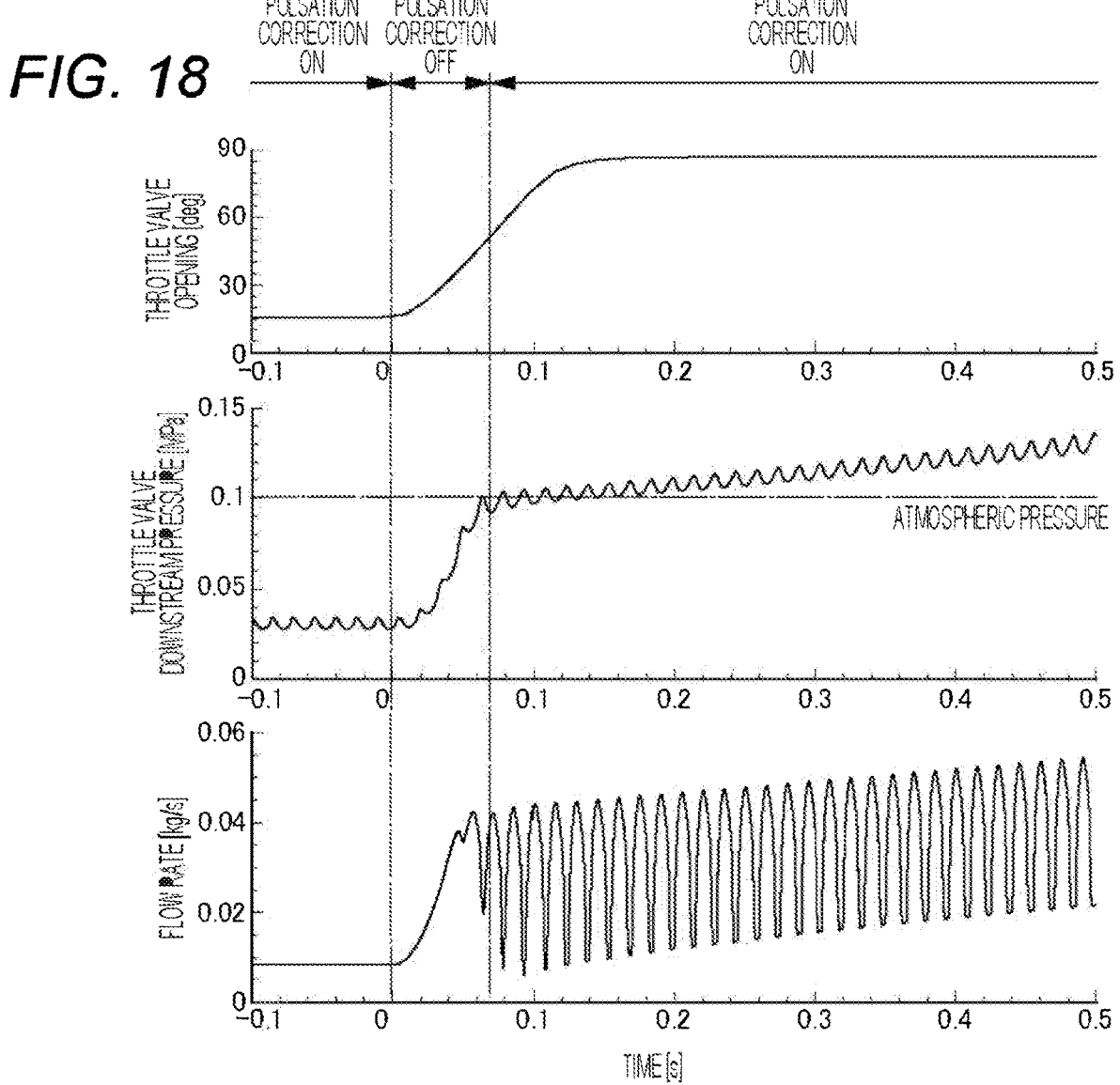
FIG. 18 is a timing chart illustrating changes in an opening of a throttle valve, a detection value of a pressure sensor, and a detection value of the flow sensor at the time of acceleration from a throttling state to a supercharging state by opening the throttle valve.

FIG. 18 is a timing chart illustrating changes in the opening of the throttle valve 7, the detection value of the boost pressure sensor 9, and the detection value of the flow sensor 2 at the time of acceleration from a throttling state to a supercharging state by opening the throttle valve 7. In FIG. 18, the horizontal axis represents time [s], and the vertical axis represents the opening [deg] of the throttle valve 7, the downstream pressure [MPa] of the throttle valve 7, and the flow rate [kg/s] in the order of the upper part, the middle part, and the lower part. The detection value of the boost pressure sensor 9 is the downstream pressure of the throttle valve 7.

As can be seen from the drawing, when the downstream pressure of the throttle valve 7 accelerates from the non-supercharging area (the lower side of the atmospheric pressure) to the supercharging area (the upper side of the atmospheric pressure) in the middle part, the pulsation component does not exist in the flow rate detection result illustrated in the lower part while the air is filled downstream of the throttle valve 7 to the atmospheric pressure condition immediately after the throttle valve 7 is opened from the throttling state (corresponding to NO determination in S13). Therefore, during this period, the pulsation correction is not necessary, and the pulsation correction is thus stopped (pulsation correction OFF). As illustrated in the lower part, the pulsation occurs in the flow rate detection result after the downstream pressure of the throttle valve 7 becomes the atmospheric pressure condition. In time periods before and after the pulsation correction OFF, the pulsation correction is set to ON. In this manner, the pulsation correction is appropriately stopped to prevent the occurrence of a flow rate error due to overcorrection.

As described above, the electronic control device (ECU 27) according to the present embodiment is configured to stop the calculation of the correction value by the flow rate correction value calculation unit 1615 (correction amount derivation unit 1614) when the amount of change in the downstream pressure of the throttle valve 7 assembled to the intake pipe during a predetermined period (feature detection period) exceeds the predetermined value (corresponding to NO in S13).

The electronic control device (ECU 27) according to the present embodiment may be configured to stop the calculation of the correction value by the flow rate correction value calculation unit (correction amount derivation unit 1614) when any of the average value, the maximum value, and the minimum value of the flow rate of the intake air calculated by the flow rate calculation unit (voltage-to-flow rate conversion unit 1602) during a predetermined period (feature detection period) and the amplitude of the signal with one or more frequencies included in the output signal of the flow rate measurement device (flow sensor 2) is out of a predetermined range.

When any of the average value, the maximum value, and the minimum value of the flow rate of the intake air and the amplitude of the signal with one or more frequencies is out of the predetermined range, the abnormality of the internal combustion engine 1 is suspected. In such a case, by appropriately stopping the pulsation correction, it is possible to prevent the occurrence of an erroneous flow rate error due to an abnormal value or a flow rate error due to overcorrection. When such an abnormality of the internal combustion engine 1 is detected, the ECU 27 may perform fail-safe processing.

[Relationship Between Pulsation Amplitude Ratio and Pulsation Correction Value]

Figure 19A:
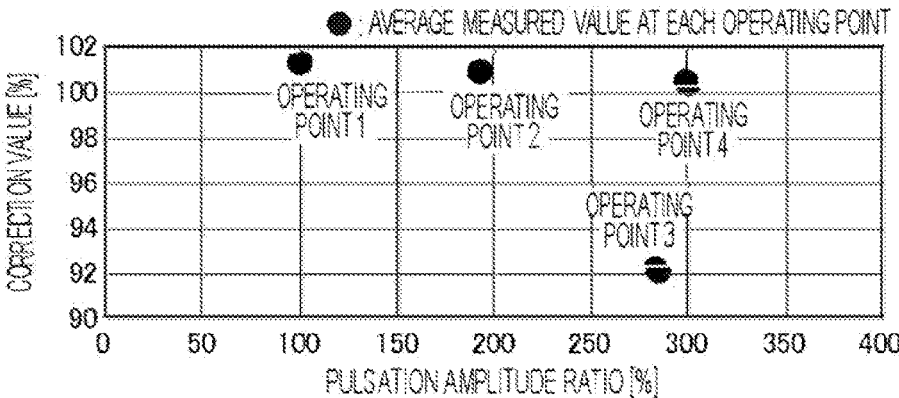
FIGS. 19A to 19C are graphs representing a relationship between a pulsation amplitude ratio and a pulsation correction value as an effect of the first and second embodiments of the present invention.
Figure 19B:
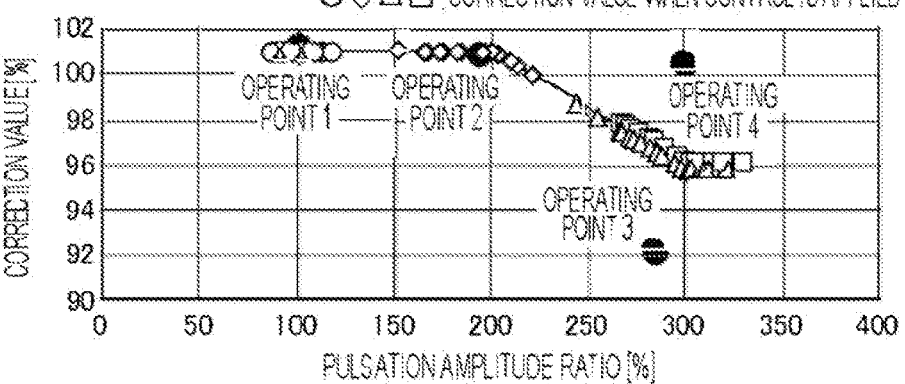
Figure 19C:
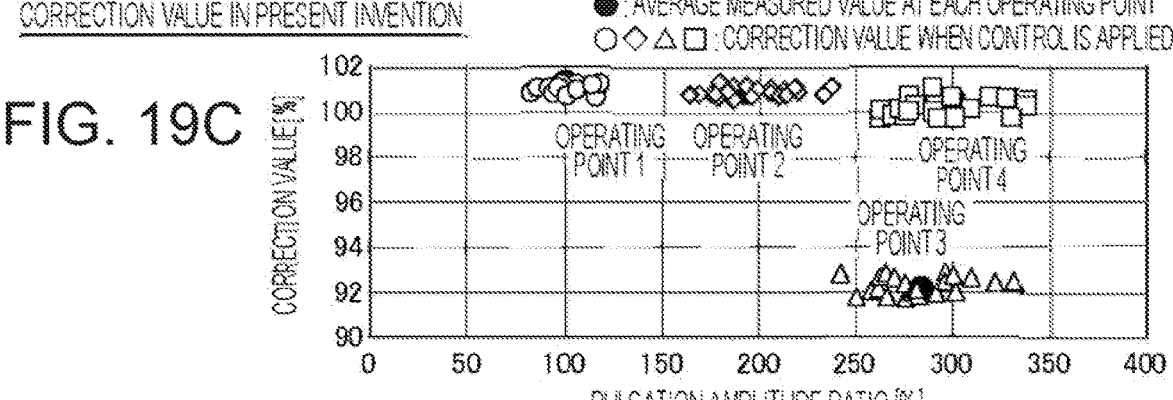

FIGS. 19A to 19C are graphs representing the relationship between the pulsation amplitude ratio and the pulsation correction value as the effect of the first and second embodiments described above. Here, the output signal of the flow sensor 2 is measured a plurality of times at each of operating points (operation conditions) 1 to 4 fixed to different throttle valve openings at a fixed rotational speed (e.g., 1500 rpm), and the pulsation amplitude ratio and the pulsation correction value are calculated.

The upper part is a graph in which a plurality of required correction values calculated from the pulsation amplitude ratios measured at each of the operating points 1 to 4 and the detection errors of the flow sensor 2 are averaged and plotted. A plot point indicated by "•" is an average measured value at each of the operating points 1 to 4. For example, the required correction values for a plurality of pulsation amplitude ratios obtained during a predetermined period such as ten seconds are averaged.

The middle part is a graph plotting correction values when the internal combustion engine 1 is operated applying the technique described in PTL 1. The plot points indicated by "○", "◇", "Δ", and "□" are average measured values when the control described in PTL 1 is applied at the respective operating points 1 to 4. The correction value "Δ" of the operating point 3 and the correction value "□" of the operating point 4 are plotted to be vertically shifted so as not to overlap each other. The solid line is a correction value set in the pulsation correction map. The pulsation correction map can be set to trace a measurement value by finely setting inflection points. For example, the solid line can be set to a shape connected from the operating point 2 side to the operating point 3 side and from the operating point 3 side to the operating point 4 side. However, a sudden change in correction amount in response to the fluctuation of the pulsation amplitude ratio is not preferred, and hence the solid line is set as illustrated in the middle part.

As illustrated in the middle part, the pulsation amplitude ratio also fluctuates at each operating point (the same operation condition) where the rotational speed and the throttle valve opening are fixed, and particularly, the change in the correction amount increases at a point where the inclination of the correction amount is large (the inclined portion of the solid line). With the pulsation amplitude ratios being substantially the same (about 300%) at the operating points 3, 4, the required correction amounts at the operating points 3, 4 are substantially the same correction values, although there is an 8% difference.

The lower part is a graph plotting correction values when the present invention is applied. The plot points indicated by "○", "◇", "Δ" and "□" are average measured values when the control of the present invention is applied at the respective operating points 1 to 4. As illustrated in the drawing, in the present invention (e.g., see FIGS. 13 to 15, including FIG. 12), the required correction amount is obtained from the pulsation feature at each operating point, and it is thus possible to separate the correction values at the operating points 3, 4. Therefore, it is possible to obtain a correction value required at each operating point.

[Relationship Between Pulsation Amplitude Ratio and Pulsation Correction Value During High Rotation]

Figure 20A:
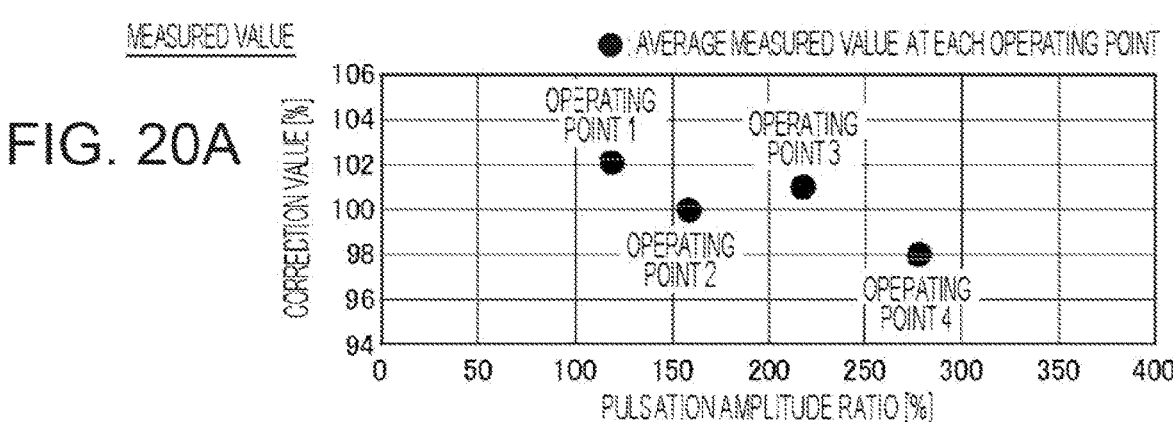
FIGS. 20A to 20C are graphs representing a relationship between a pulsation amplitude ratio and a pulsation correction value at high rotation as an effect of the first and second embodiments of the present invention.
Figure 20B:
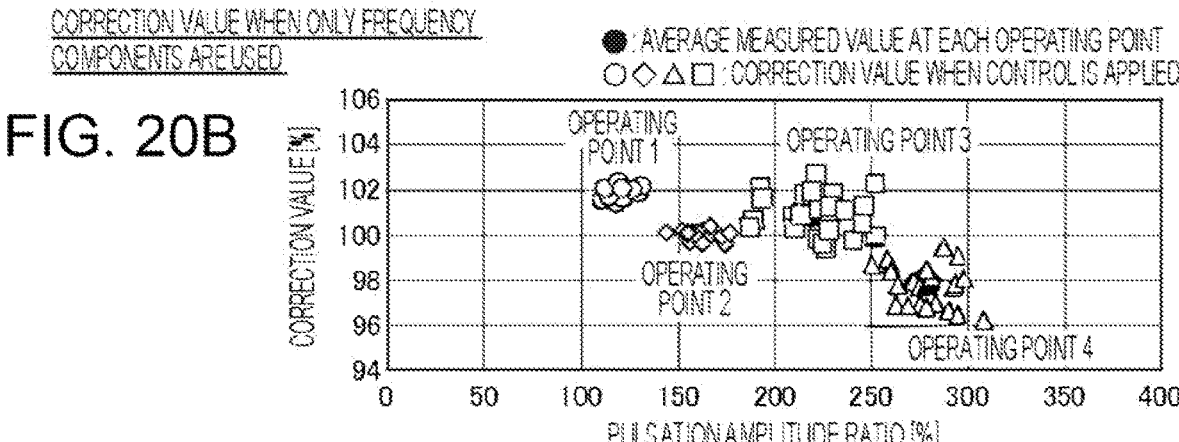
Figure 20C:
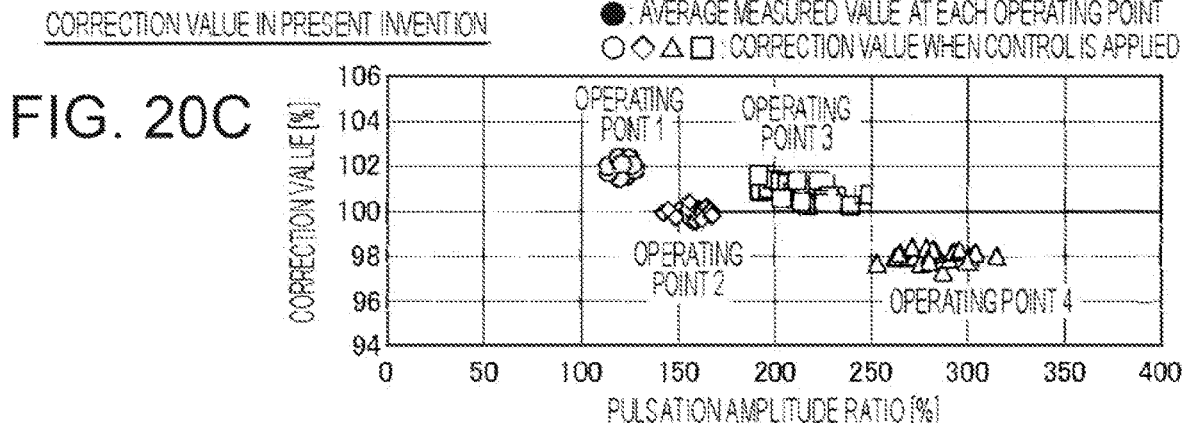

FIGS. 20A to 20C are graphs representing the relationship between the pulsation amplitude ratio and the pulsation correction value at high rotation as the effect of the first and second embodiments described above. Here, the output signal of the flow sensor 2 is measured a plurality of times at each of the operating points (operation conditions) 1 to 4 fixed to different throttle valve openings at a relatively high fixed rotational speed (e.g., 4000 rpm), and the pulsation amplitude ratio and the pulsation correction value are calculated.

The upper part is a graph in which a plurality of required correction values calculated from the pulsation amplitude ratios measured at each of the operating points 1 to 4 at a high rotational speed (e.g., 4000 rpm) and the detection errors of the flow sensor 2 are averaged and plotted. A plot point indicated by "•" is an average measured value at each of the operating points 1 to 4.

The middle part is a graph in which correction values when only the pulsation amplitudes of the flow rate signals having passed through the bandpass filters 1604 to 1607 with different frequencies are used as inputs to the correction amount derivation unit 1614 are plotted as the feature of the pulsation waveforms. The plot points indicated by "○", "◇", "Δ", and "□" are average measured values when the pulsation amplitudes of different frequency components of the flow rate signals are applied at the respective operating points 1 to 4. That is, the position of the average value between the maximum value and the minimum value of the flow rate signal is not considered for the correction value indicated by each plot point. As illustrated in the drawing, the frequency included in the pulsation waveform increases at the high rotation, but the attenuation increases as the frequency increases, so that the difference in the feature at each operating point decreases, and the detection error of the flow sensor 2 increases. Thus, the variation in the correction value is large among the operating points 1 to 4.

The lower part is a graph obtained by plotting correction values when the present invention is applied, that is, when the average value, the maximum value, and the minimum value of the flow rate signal are added to the pulsation amplitudes of the flow rate signals having passed through the bandpass filters 1604 to 1607 with different frequencies as the features of the pulsation waveform. The plot points indicated by "○", "◇", "Δ" and "□" are average measured values when the control of the present invention is applied at the respective operating points 1 to 4. As illustrated in FIGS. 11A, 11B, and 12, in the present invention, even when the high-frequency component attenuates, the positional relationship of the average value, the maximum value, and the minimum value of the flow rate signal is included in one of the pulsation features, and it is thus possible to obtain a correction value required at each operating point.

As described above, the electronic control device (ECU 27) according to the second embodiment includes: the flow rate calculation unit (voltage-to-flow rate conversion unit 1602) that calculates the flow rate of the intake air based on the output signal of the flow rate measurement device (flow sensor 2) assembled to the intake pipe; the flow rate correction value calculation unit (flow rate correction value calculation unit 1615) that calculates the average value (μ), the maximum value (max), and the minimum value (mix) of the flow rate of the intake air, calculated by the flow rate calculation unit, during a predetermined period (feature detection period), and the amplitude (σ1 to σ4) of the signal with one or more frequencies equal to or higher than the fundamental frequency of the output signal of the flow rate measurement device and included in the output signal of the flow rate measurement device, and calculates the correction value (δ) for the flow rate of the intake air based on the calculation result; and a flow rate correction unit (flow rate correction unit 1620) that corrects the flow rate (overlined u) of the intake air based on the correction value.

According to the second embodiment configured as described above, the detection error of the flow rate measurement device is corrected based on the average value, the maximum value, and the minimum value of the output signal of the flow rate measurement device (flow sensor 2) and the amplitude information of one or more frequency components included in the output signal of the flow rate measurement device. As a result, the flow rate of the intake air can be accurately obtained even in an operation condition of the internal combustion engine in which various pulsations occur in the flow of the intake air at the position of the flow rate measurement device. Therefore, it is possible to prevent deterioration in the exhaust gas property and deterioration in the fuel consumption of the internal combustion engine, which are concerned at the time of large pulsation.

In the electronic control device (ECU 27) according to the present embodiment described above, the flow rate correction value calculation unit (flow rate correction value calculation unit 1615) includes a neural network model (correction amount derivation unit 1614) that receives, as input, the average value (μ), the maximum value (max), and the minimum value (mix) of the flow rate of the intake air, calculated by the flow rate calculation unit (voltage-to-flow rate conversion unit 1602), during a predetermined period (feature detection period), and the amplitude of a signal with one or more frequencies equal to or higher than the fundamental frequency of the output signal of the flow rate measurement device (flow sensor 2) and included in the output signal of the flow rate measurement device, and outputs a correction value (e.g., the pulsation correction amount δ) for the flow rate of the intake air.

According to the present embodiment configured as described above, similarly to the case of using the multidimensional pulsation correction map 1200 illustrated in FIG. 12, the neural network model can be used to determine the correction value corresponding to the difference in the position of the average value between the maximum value and the minimum value of the output signal of the flow rate measurement device (flow sensor 2).

In the electronic control device (ECU 27) according to the present embodiment described above, the correction value is a correction coefficient and/or a correction amount, and the flow rate correction unit (flow rate correction unit 1620) multiplies the flow rate (overlined u) of the intake air calculated by the flow rate calculation unit (voltage-to-flow rate conversion unit 1602) by the correction coefficient (pulsation correction amount δ), adds the correction amount, or multiplies the correction coefficient and adds the correction amount.

Third Embodiment

A third embodiment is configured to appropriately select a bandpass filter to be used from the plurality of bandpass filters 1604 to 1607 in accordance with the rotational speed of the internal combustion engine 1.

[Pulsation Correction Logic]

Figure 21:
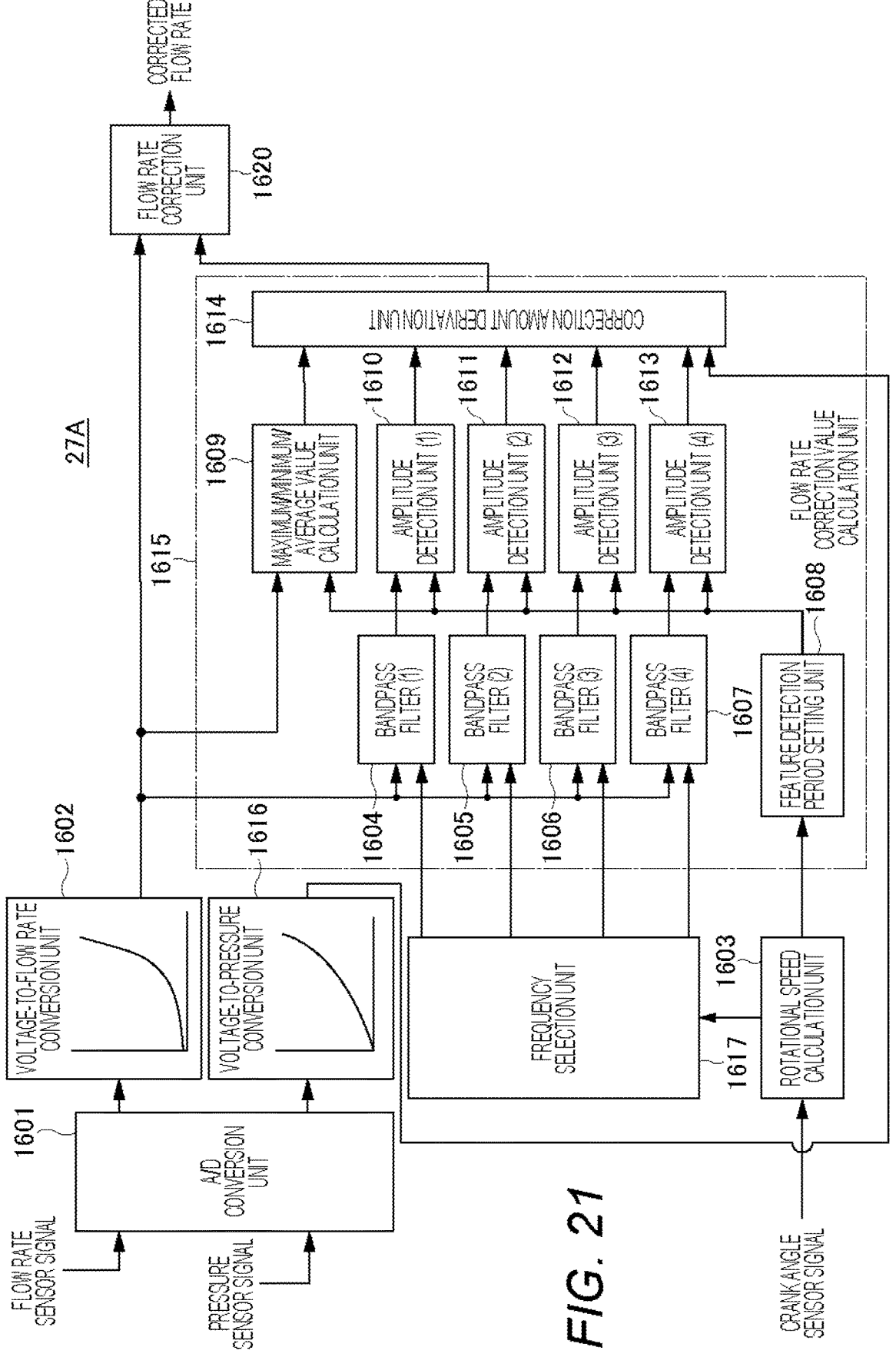
FIG. 21 is a block diagram illustrating an example of a pulsation correction logic that is mounted in an ECU of the present invention and corrects a detection error of a flow sensor according to a third embodiment.

FIG. 21 is a block diagram illustrating an example of a pulsation correction logic that corrects the detection error of the flow sensor 2 mounted in an ECU 27A according to the third embodiment of the present invention. The ECU 27A is different from the ECU 27 (cf. FIG. 16) in that a frequency selection unit 1617 is provided. Hereinafter, the ECU 27A will be described focusing on a difference from the ECU 27.

The frequency selection unit 1617 selects a bandpass filter to be used from the plurality of bandpass filters 1604 to 1607 based on the rotational speed of the internal combustion engine 1 calculated by the rotational speed calculation unit 1603, and outputs a selection signal to the corresponding bandpass filter.

The bandpass filter having received the selection signal from the frequency selection unit 1617 performs filter processing on the flow rate signal (pulsation waveform) input from the voltage-to-flow rate conversion unit 1602, and outputs a processing result to the corresponding amplitude detection unit.

As described above, the flow rate correction value calculation unit (flow rate correction value calculation unit 1615) according to the present embodiment includes the frequency selection unit (frequency selection unit 1617) that selects the frequency as a calculation target based on the rotational speed of the internal combustion engine at the time of calculating the amplitude of the signal with one or more frequencies included in the output signal of the flow rate measurement device (flow sensor 2).

The frequency selection unit (frequency selection unit 1617) selects a combination of at least one or more frequencies from a fundamental frequency determined by the rotational speed of the internal combustion engine and harmonic frequencies at the time of calculating the amplitude of the signal with one or more frequencies included in the output signal of the flow rate measurement device (flow sensor 2). For example, among the bandpass filters (1) to (4), the bandpass filter (1) may be set to the fundamental frequency, and the bandpass filters (2) to (4) may be set to the second-harmonic to fourth-harmonic frequencies. For improving the inference accuracy of the correction value, it is useful to select a plurality of frequencies (bandpass filters) including the fundamental frequency. However, only the fundamental frequency, or a plurality of frequencies not including the fundamental frequency, may be selected.

The frequency selection unit (frequency selection unit 1617) may be configured to select a combination of at least one or more frequencies from one or more fixed frequencies, a fundamental frequency determined by the rotational speed of the internal combustion engine and harmonic frequencies at the time of calculating the amplitude of the signal with one or more frequencies included in the output signal of the flow rate measurement device (flow sensor 2). For example, among the bandpass filters (1) to (4), the bandpass filter (1) may be set to the fixed frequency, the bandpass filter (2) may be set to the fundamental frequency, and the bandpass filters (3) and (4) may be set to harmonic frequencies.

In the third embodiment configured as described above, the same effect as that of the first and second embodiments can be obtained. Furthermore, in the third embodiment, the following effect different from those of the first and second embodiments can also be obtained. According to the third embodiment, the frequency selection unit (frequency selection unit 1617) can select an appropriate frequency as a calculation target in accordance with the rotational speed of the internal combustion engine. Therefore, the correction value of the flow rate of the intake air can be calculated in consideration of the amplitude of the signal with any frequency included in the output signal of the flow rate measurement device (flow sensor 2). Therefore, the flow rate of the intake air can be accurately obtained even in an operation condition of the internal combustion engine in which various pulsations occur in the flow of the intake air at the position of the flow rate measurement device.

Modification

In the first to third embodiments described above, the maximum value, the minimum value, and the average value of the output signal (flow rate signal) of the flow sensor 2 have been used, but the present invention is not limited thereto. For example, even when a combination of the upper amplitude (absolute value), the lower amplitude (absolute value), and the average value of the flow rate signal or a combination of the amplitude value, the average value, and the position of the average value within the amplitude is used, the same effect as described above is obtained.

In the first to third embodiments described above, one or more Fourier transform units (not illustrated) may be provided instead of one or more bandpass filters (bandpass filters (1) to (4)) each provided corresponding to any of the one or more frequencies included in the output signal of the flow sensor 2. For example, Fourier transform units (1) to (4) are provided instead of the bandpass filters (1) to (4) illustrated in FIG. 16, and frequencies as processing targets are set in the Fourier transform units (1) to (4).

The Fourier transform unit (1) performs Fourier transform on the flow rate signal, extracts a fundamental wave from the transform result, and outputs the fundamental wave to the amplitude detection unit (1). The Fourier transform unit (2) performs Fourier transform on the flow rate signal, extracts the second harmonic from the transform result, and outputs the second harmonic to the amplitude detection unit (2). Similarly, the Fourier transform unit (3) extracts the third harmonic from the Fourier transform result for the flow rate signal and outputs the third harmonic to the amplitude detection unit (3), and the Fourier transform unit (4) extracts the fourth harmonic from the Fourier transform result for the flow rate signal and outputs the fourth harmonic to the amplitude detection unit (4).

Then, the respective amplitude detection units (1) to (4) corresponding to the Fourier transform units (1) to (4) calculate the amplitudes of the fundamental wave or the harmonics output from the corresponding Fourier transform units (1) to (4). Even when the Fourier transform units are provided instead of the bandpass filters as described above, it is possible to obtain the same effect as when the bandpass filter is provided.

In the first to third embodiments, the passbands of the bandpass filters (1) to (4) may be changed. For example, the bandpass filter is configured to be able to change a passable frequency band by changing or switching the logical configuration, parameters, or the like of the bandpass filter. When selecting a frequency based on the rotation number, the frequency selection unit 1617 outputs a frequency selection signal to any of the bandpass filters (1) to (4). The bandpass filter with the frequency selection signal input thereto changes the passband based on frequency information included in the frequency selection signal. Then, the bandpass filter outputs a signal having passed through the changed passband to the corresponding amplitude detection unit.

Furthermore, the present invention is not limited to each of the embodiments described above, and it goes without saying that various other application examples and modifications can be taken without departing from the gist of the present invention described in the claims.

For example, the above-described embodiments each describe the configuration of the electronic control device (ECU 27, 27A) in detail and specifically in order to describe the present invention in an easy-to-understand manner, and are not necessarily limited to those including all the constituent elements described above. It is possible to replace a part of the configuration of one embodiment with a constituent element of another embodiment. It is also possible to add constituent elements of other embodiments to the configuration of one embodiment. It is also possible to add, replace, or delete other constituent elements for a part of the configuration of each embodiment.

Each of the configurations, functions, processing units, and the like described above may be realized in hardware by designing some or all of those in an integrated circuit, for example. A processor device in a broad sense such as a field-programmable gate array (FPGA) or an application-specific integrated circuit (ASIC) may be used as the hardware.

Further, in the flowchart illustrated in FIG. 17, a plurality of pieces of processing may be performed in parallel or the processing order may be changed within a range not affecting the processing result.

REFERENCE SIGNS LIST

1 Internal combustion engine
2 flow sensor
7 throttle valve
9 boost pressure sensor
15 fuel injection valve
16 spark plug
18 crank angle sensor
22 EGR pipe
24 EGR valve
27, 27A ECU
1602 voltage-to-flow rate conversion unit
1603 rotational speed calculation unit
1604 to 1607 bandpass filter
1608 feature detection period setting unit
1609 maximum/minimum/average value calculation unit
1610 to 1613 amplitude detection unit
1614 correction amount derivation unit
1615 flow rate correction value calculation unit
1616 voltage-to-pressure conversion unit
1620 flow rate correction unit
1615 flow rate correction value calculation unit
1620 flow rate correction unit

The invention claimed is:

1. An electronic control device comprising:
a flow rate calculation unit that calculates a flow rate of intake air based on an output signal of a flow rate measurement device assembled to an intake pipe;
a flow rate correction value calculation unit that calculates an average value, a maximum value, and a minimum value of the flow rate of the intake air, calculated by the flow rate calculation unit, during a predetermined period, and an amplitude of a signal with one or more frequencies equal to or higher than a fundamental frequency of the output signal of the flow rate measurement device and included in the output signal of the flow rate measurement device, and using a relative position of the average value with respect to the maximum value and the minimum value, and the amplitude of the signal with one or more frequencies, as parameters, calculates a correction value for the flow rate of the intake air based on calculation results; and
a flow rate correction unit that corrects the flow rate of the intake air based on the correction value.

2. The electronic control device according to claim 1, wherein the flow rate correction value calculation unit includes
one or more bandpass filters provided corresponding to any of the one or more frequencies included in the output signal of the flow rate measurement device, and
one or more amplitude detection units that are provided corresponding to the one or more bandpass filters and calculate an amplitude of the output signal having passed through the corresponding bandpass filter.

3. The electronic control device according to claim 1, wherein the flow rate correction value calculation unit includes one or more Fourier transform units provided corresponding to any of the one or more frequencies included in the output signal of the flow rate measurement device, and
one or more amplitude detection units that are provided corresponding to the one or more Fourier transform units and calculate an amplitude of a fundamental wave or a harmonic output from the corresponding Fourier transform unit.

4. The electronic control device according to claim 1, wherein the flow rate correction value calculation unit includes a neural network model that receives, as input, an average value, a maximum value, and a minimum value of the flow rate of the intake air, calculated by the flow rate calculation unit, during a predetermined period, and an amplitude of a signal with one or more frequencies equal to or higher than a fundamental frequency of the output signal of the flow rate measurement device and included in the output signal of the flow rate measurement device, the neural network model outputting a correction value for the flow rate of the intake air.

5. The electronic control device according to claim 4, wherein the flow rate correction value calculation unit includes a frequency selection unit that selects a frequency as a calculation target based on a rotational speed of the internal combustion engine at a time of calculating the amplitude of the signal with the one or more frequencies.

6. The electronic control device according to claim 5, wherein at a time of calculating the amplitude of the signal with the one or more frequencies, the frequency selection unit selects a combination of at least one or more frequencies from a fundamental frequency and a harmonic frequency determined by a rotational speed of the internal combustion engine.

7. The electronic control device according to claim 5, wherein at a time of calculating the amplitude of the signal with the one or more frequencies, the frequency selection unit selects a combination of at least one or more frequencies from one or more frequencies fixed, and a fundamental frequency and a harmonic frequency that are determined by a rotational speed of the internal combustion engine.

8. The electronic control device according to claim 1, wherein the calculation of the flow rate correction value calculation unit and the correction of the flow rate correction unit are performed in a period synchronized with an intake interval of an internal combustion engine.

9. The electronic control device according to claim 8, wherein the predetermined period when the flow rate correction value calculation unit calculates the average value, the maximum value, and the minimum value of the flow rate of the intake air calculated by the flow rate calculation unit is a period synchronized with the intake interval of the internal combustion engine or an integral multiple of the period.

10. The electronic control device according to claim 1, wherein
the correction value is a correction coefficient and/or a correction amount, and
the flow rate correction unit multiplies the flow rate of the intake air calculated by the flow rate calculation unit by the correction coefficient, adds the correction amount, or multiplies the flow rate by the correction coefficient and adds the correction amount.

11. The electronic control device according to claim 1, wherein the calculation of the correction value by the flow rate correction value calculation unit is stopped when an amount of change in downstream pressure of a throttle valve assembled to the intake pipe during the predetermined period exceeds a predetermined value.

12. The electronic control device according to claim 1, wherein the calculation of the correction value by the flow rate correction value calculation unit is stopped when any of the average value, the maximum value, and the minimum value of the flow rate of the intake air, calculated by the flow rate calculation unit, during the predetermined period, and the amplitude of the signal with the one or more frequencies included in the output signal of the flow rate measurement device is out of a predetermined range.

13. A flow rate measurement system comprising:

a flow rate measurement device assembled to an intake pipe; and an electronic control device, wherein the electronic control device includes a flow rate calculation unit that calculates a flow rate of intake air based on an output signal of the flow rate measurement device, a flow rate correction value calculation unit that calculates an average value, a maximum value, and a minimum value of the flow rate of the intake air, calculated by the flow rate calculation unit, during a predetermined period, and an amplitude of a signal with one or more frequencies equal to or higher than a fundamental frequency of the output signal of the flow rate measurement device and included in the output signal of the flow rate measurement device, and, using a relative position of the average value with respect to the maximum value and the minimum value, and the amplitude of the signal with one or more frequencies as parameters, calculates a correction value for the flow rate of the intake air based on calculation results, and a flow rate correction unit that corrects the flow rate of the intake air based on the correction value.

* * * * *